United States Patent
Kempf et al.

(10) Patent No.: US 12,302,117 B2
(45) Date of Patent: May 13, 2025

(54) SPECTRUM ALLOCATION USING A DISTRIBUTED LEDGER NETWORK

(71) Applicant: Telefonaktiebolaget LM Ericsson (publ), Stockholm (SE)

(72) Inventors: James Kempf, Mountain View, CA (US); Kumar Balachandran, Pleasanton, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 485 days.

(21) Appl. No.: 17/873,464

(22) Filed: Jul. 26, 2022

(65) Prior Publication Data
US 2022/0361001 A1 Nov. 10, 2022

Related U.S. Application Data

(63) Continuation of application No. 17/269,754, filed as application No. PCT/SE2019/050723 on Aug. 2, 2019, now Pat. No. 11,405,796.
(Continued)

(51) Int. Cl.
*H04W 16/14* (2009.01)
*H04W 12/037* (2021.01)
(Continued)

(52) U.S. Cl.
CPC ......... *H04W 16/14* (2013.01); *H04W 12/037* (2021.01); *H04W 12/04* (2013.01); *H04W 28/18* (2013.01)

(58) Field of Classification Search
CPC ... H04W 12/04; H04W 12/037; H04W 16/14; H04W 28/16; H04W 28/18; H04W 28/20; H04W 28/22; H04W 28/26
See application file for complete search history.

(56) References Cited

U.S. PATENT DOCUMENTS 8,279,786 B1 * 10/2012 Smith .................. H04W 16/14
370/310
8,958,810 B2 * 2/2015 Buddhikot ............ H04W 16/10
455/452.2
(Continued)

FOREIGN PATENT DOCUMENTS

| CN | 105144768 A | 12/2015 |
| CN | 106165467 A | 11/2016 |
| WO | 2016/070900 A1 | 5/2016 |

OTHER PUBLICATIONS

Atkins, Paige R., "Promoting Investment in the 3550-3700 MHz Band", United States Department of Commerce, NTIA Filing 1051705880764, May 17, 2018, 17 pages.
(Continued)

*Primary Examiner* — Quochien B Vuong
(74) *Attorney, Agent, or Firm* — NICHOLSON DE VOS WEBSTER & ELLIOTT LLP

(57) ABSTRACT

A method and a spectrum owner system are described. The spectrum owner system records, in a distributed ledger network, a list of spectrum resources licensed from a regulatory authority system to the spectrum owner system. The spectrum owner system receives an authorization request for a spectrum allocation of spectrum resources, where the spectrum allocation includes at least a desired interval of time for usage of the spectrum resources by a radio access network of a spectrum renter, a desired location for usage of the spectrum resources by the radio access network, and additional characteristics of the spectrum resources. The spectrum owner system negotiates agreement terms for the desired spectrum allocation; and records, in the distributed ledger network, a hash of the spectrum allocation, where the spectrum allocation enables the radio access network of the spectrum renter to provide radio access services to wireless network devices.

20 Claims, 13 Drawing Sheets

Related U.S. Application Data

(60) Provisional application No. 62/721,260, filed on Aug. 22, 2018.

(51) Int. Cl.
*H04W 12/04* (2021.01)
*H04W 28/18* (2009.01)

(56) References Cited

U.S. PATENT DOCUMENTS

| | | | |
|---|---|---|---|
| 9,066,238 B2* | 6/2015 | Stanforth | H04W 16/14 |
| 10,340,976 B2* | 7/2019 | Kakinada | H04W 16/14 |
| 2014/0256345 A1 | 9/2014 | Arefi et al. | |
| 2014/0321369 A1 | 10/2014 | Davydov et al. | |
| 2015/0334717 A1 | 11/2015 | Rashid et al. | |
| 2015/0373554 A1 | 12/2015 | Freda et al. | |
| 2016/0259923 A1 | 9/2016 | Papa et al. | |
| 2017/0208476 A1 | 7/2017 | Khambekar et al. | |
| 2017/0215079 A1 | 7/2017 | Fortman et al. | |
| 2017/0318022 A1 | 11/2017 | Perez et al. | |
| 2018/0174157 A1 | 6/2018 | Endress et al. | |

OTHER PUBLICATIONS

Bubley, Dean, "Blockchain & Distributed Ledgers: Potential opportunities for the telecom and networking sectors", Disruptive Analysis Ltd., Commissioned by Juniper Networks Inc., Aug. 2017, 12 pages.
CBRS Alliance, "CBRS Coexistence Technical Specification", CBRSA-TS-2001, V1.0.0, Feb. 1, 2018, 20 pages.
CBRS Alliance, "CBRS Network Service Technical Specification", CBRSA-TS-1001, V1.0.0, Feb. 1, 2018, 19 pages.
CBRS Alliance, "CBRS Network Service Technical Specifications", CBRSA-TS-1002, V1.0.0, Feb. 1, 2018, 26 pages.
ETSI, "Reconfigurable Radio Systems (RRS); Information Elements and Protocols for the Interface Between LSA Controller (LC) and LSA Repository (LR) for Operation of Licensed Shared Access (LSA) in the 2 300 MHz-2 400 MHz band", Technical Specification, ETSI TS 103 379 V1.1.1, Jan. 2017, 40 pages.
European Search Report and Written Opinion, EP App. No. 19851716.1, Sep. 2, 2021, 8 pages.
Federal Communications Commission, "Amendment of the Commission's Rules with Regard to Commercial Operations in the 3550-3650 MHz Band—Report and Order and Second Further Notice of Proposed Rulemaking", FCC 15-47, Apr. 21, 2015, 187 pages.
Federal Communications Commission, "Amendment of the Commission's Rules with Regard to Commercial Operations in the 3550-3650 MHz Band—Order on Reconsideration and Second Report and Order", FCC 16-55, May 2, 2016, 123 pages.
Federal Information Processing Standards Publication 197, "Announcing the Advanced Encryption Standard (AES)", Nov. 26, 2001, 51 pages.
Github, "Transaction Processing", Available Online at <https://github.com/jpmorganchase/quorum/wiki/Transaction-Processing>, Aug. 17, 2018, 5 pages.
Hyperledger, "Channels", Available Online at <https://hyperledger-fabric.readthedocs.io/en/latest/channels.html>, Aug. 1, 2018, 1 page.
International Preliminary Report on Patentability, PCT App. No. PCT/SE2019/050723, Mar. 4, 2021, 8 pages.
International Search Report and Written Opinion, PCT App. No. PCT/SE2019/050723, Nov. 8, 2019, 11 pages.
Kotobi et al., "Secure Blockchains for Dynamic Spectrum Access: A Decentralized Database in Moving Cognitive Radio Networks Enhances Security and User Access", IEEE Vehicular Technology Magazine, Mar. 2018, pp. 32-39.
Non-Final Office Action, U.S. Appl. No. 17/269,754, Sep. 15, 2021, 14 pages.
Notice of Allowance, U.S. Appl. No. 17/269,754, Mar. 29, 2022, 5 pages.
Rawat et al., "Leveraging Distributed Blockchain-based Scheme for Wireless Network Virtualization with Security and QoS Constraints", 2018 International Conference on Computing, Networking and Communications (ICNC): Communications and Information Security Symposium, Mar. 2018, pp. 332-336.
Rescorla, E., "Diffie-Hellman Key Agreement Method", Request for Comments: 2631, Network Working Group, Jun. 1999, pp. 1-12.
Tendermint, "Welcome to Tendermint!", Available Online at <https://tendermint.readthedocs.io/en/master/>, Jul. 31, 2018, 2 pages.
Wikipedia, "Raft (computer science)", Available Online at <https://en.wikipedia.org/wiki/Raft_(computer_science)>, May 4, 2018, 4 pages.
Wikipedia, "Software Guard Extensions", Available Online at <https://en.wikipedia.org/wiki/Software_Guard_Extensions>, Aug. 15, 2018, 3 pages.
Wikipedia, "Trusted Platform Module", Available Online at <https://en.wikipedia.org/wiki/Trusted_Platform_Module>, May 30, 2018, 10 pages.
Wireless Innovation Forum, "CBRS Communications Security Technical Specification", WINNF-TS-0065, Version V1.1.0, (Formerly WINNF-15-S-0065-V2.0.0), Jul. 26, 2017, 25 pages.
Wireless Innovation Forum, "Requirements for Commercial Operation in the U.S. 3550-3700 MHz Citizens Broadband Radio Service Band", WINNF-TS-0112, Version V1.4.1, Jan. 16, 2018, 77 pages.
Wireless Innovation Forum, "Signaling Protocols and Procedures for Citizens Broadband Radio Service (CBRS): Spectrum Access System (SAS)—Citizens Broadband Radio Service Device (CBSD) Interface Technical Specification", WINNF-TS-0016, Version V1.2.1, Jan. 3, 2018, 60 pages.
Wireless Innovation Forum, "Signaling Protocols and Procedures for Citizens Broadband Radio Service (CBRS): Spectrum Access System (SAS)—SAS Interface Technical Specification", WINNF-TS-0096, Version 1.2.0, Oct. 20, 2017, 42 pages.
Office Action and Search Report, CN App. No. 201980069715.3, May 12, 2023, 8 pages of Original Document Only.
Notice of Grant, CN App. No. 201980069715.3, Jan. 6, 2024, 3 pages (2 pages of English translation and 1 page of Original Document).
Office Action, EP App. No. 19851716.1, Jun. 27, 2023, 8 pages.

* cited by examiner

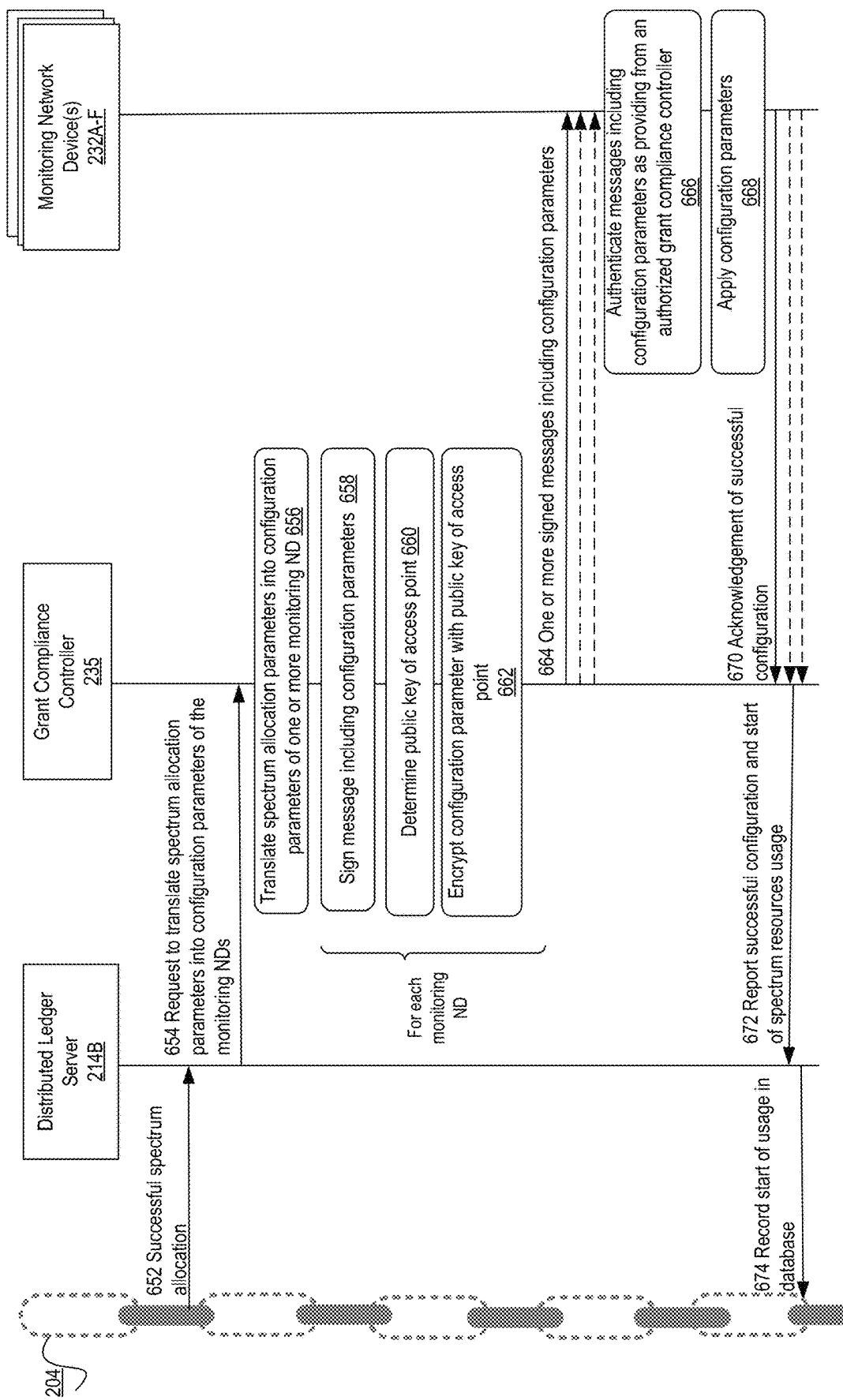

ESTABLISH, WITH THE SPECTRUM RENTER SYSTEM, A PRIVATE TRANSACTION CHANNEL IN THE DISTRIBUTED LEDGER NETWORK
902

TRANSMIT, THROUGH THE PRIVATE TRANSACTION CHANNEL, PROPOSED AGREEMENT TERMS FOR THE SPECTRUM ALLOCATION
904

RECEIVE, FROM THE SPECTRUM RENTER SYSTEM, ACCEPTED AGREEMENT TERMS FOR THE SPECTRUM ALLOCATION
906

SECURELY STORE THE SPECTRUM ALLOCATION AND THE ACCEPTED AGREEMENT TERMS FOR THE SPECTRUM ALLOCATION, WHEREIN THE SPECTRUM ALLOCATION INCLUDES A SET OF SPECTRUM ALLOCATION PARAMETERS INCLUDING THE DESIRED INTERVAL OF TIME, THE DESIRED LOCATION, AND THE CHARACTERISTICS OF THE SPECTRUM RESOURCES TO BE USED FOR THE DESIRED INTERVAL OF TIME AND THE DESIRED LOCATION
908

FIGURE 9

SPECTRUM ALLOCATION USING A DISTRIBUTED LEDGER NETWORK

CROSS-REFERENCE TO RELATED APPLICATIONS

This application is a continuation of U.S. Ser. No. 17/269,754, filed Feb. 19, 2021, which is a National stage of International Application No. PCT/SE2019/050723, filed Aug. 2, 2019, which claims priority to U.S. Application No. 62/721,260, filed Aug. 22, 2018, which are hereby incorporated by reference.

TECHNICAL FIELD

Embodiments of the invention relate to the field of distributed digital ledger technology; and more specifically, to a spectrum allocation using smart contracts.

BACKGROUND ART

The rapid expansion of traffic from wireless broadband use has consistently placed the commercial cellular industry under pressure. For many decades, spectrum resources allocated to various services have proceeded using three essential regimes: (1) Licensing, (2) Shared/Coordinated, and (3) License exempt. Economists have suggested that the policies followed by regulators do not efficiently allocate spectrum to specific use cases efficiently. A hypothetical scan through the addressable radio spectrum would show vast swathes of spectrum that are allocated via regulatory fiat to various services, that largely lie unused at most spatial and temporal sample points in a nation. This would suggest that spectrum should be managed like a scarce resource that should be priced in proportion to the demand Such ideas are easier to propose than to put into actual practice, and various economic and practical considerations prevent creating a free marketplace for spectrum. What cannot be denied is a place for a category of spectrum resource, that values spectrum for its utility in space and in time. Even with the rapid adoption of digital technologies for radio transmission, it is not cost effective to build radios that are completely frequency agile. There are significant differences between the transmission characteristics of different services such as broadcast, terrestrial communication, mobile cellular radio, fixed services, satellite communication, radio-navigation, radiolocation and various other passive and active radio applications. The value of a particular service is difficult to quantify in a manner that creates an even comparative basis with other services.

Current solutions for spectrum marketplaces are based on centralized approaches to maintain databases of current use. FIG. 1 illustrates an example of such centralized approach. One decentralized way of achieving this has been practiced in the 3650-3700 MHz band under regulations for light licensing for the Wireless Broadband Service in the 47 CFR Part 90 Subpart Z. The band is being used sparsely in the United States by wireless Internet service providers (WISP), fixed wireless users, or utility companies for applications such as meter reading. Users acquire a nationwide license for a nominal fee and are required to coordinate use of the spectrum on a site by site basis that is registered in the Universal Licensing System (ULS), which is a Federal Communications Commission (FCC) database 102. The regulations for the service are grandfathered until 2020, at which time the users will be eligible to operate under General Authorized Access (GAA) terms in the Citizen's Broadband Wireless Service (CBRS).

In Europe, the European Telecommunications Standards Institute (ETSI) is developing and evolving Licensed Shared Access (LSA) as a way of creating binary sharing between an incumbent and a secondary service. ETSI, "Reconfigurable Radio Systems (RRS); Information elements and protocols for the interface between LSA Controller (LC) and LSA Repository (LR) for operation of Licensed Shared Access (LSA) in the 2 300 MHz-2 400 MHz band," TS 103 379, V1.1.1, January 2017 presents initial standards work that has been completed to define sharing between Long Term Evolution (LTE) and military radar at 2300-2400 MHz. While LSA relies on the regulator creating the terms for spectrum sharing, rights to spectrum are clearly assigned in the terms of the LSA contract, as are the responsibilities of each user of the spectrum, whether operating on a co-primary or secondary basis. The disadvantage with the methodology followed by LSA is that the terms of the contract cannot be modified during the period of the contract. Fixed Service deployments in some bands such as the E-Band are also lightly licensed. Coordination of such use cases is done using databases that are administered by private entities.

During 2003-2004, the FCC announced rules permitting spectrum leasing and established streamlined processing procedures for reviewing and approving spectrum leasing arrangements (as well as license assignments and transfers). It is valid for almost 100 radio services in different parts of the spectrum. The US regulation defines two options for leasing, depending on the type of control on the spectrum (e.g., de jure or de facto control of the spectrum):

a. de jure control over the spectrum means that one has legal control of the spectrum. Typically, ownership of more than 50 percent of the voting stock of a corporate licensee offers evidence of de jure control.

b. de facto control over the spectrum typically means the radio network owner

There are two options for leasing spectrum usage rights a. Spectrum Manager Lease b. de facto Transfer Lease Under the option Spectrum Manager Lease, parties can enter into spectrum leasing arrangements without prior Commission approval so long as the licensee retains both de jure control of the license and de facto control over the leased spectrum. De facto control of the leased spectrum includes ongoing oversight responsibilities as well as direct accountability for ensuring their lessees' compliance with the Commission's policies and rules.

Under the option de facto Transfer Lease, parties may enter into leasing arrangements whereby the licensee retains de jure control of their licenses while de facto control over the use of the leased spectrum, and associated rights and responsibilities, are transferred for a defined period to the spectrum lessees. Parties may enter into either long-term or short-term leases, with some variation in the policies and procedures that apply to each type. Spectrum lessees may lease spectrum usage rights for any period or time during the term of the license.

FCC, "Amendment of the Commission's Rules with Regard to Commercial Operations in the 3550-3650 MHz Band," FCC-15-47, GN Docket 12-354, April 2015; and FCC, "Order on Reconsideration and Second Report and Order," FCC-16-55, GN Docket 12-354, May 2016 present Citizens' Band Radio System (CBRS). The CBRS is defined between 3550-3700 MHz and is a spectrum sharing arrangement between three tiers of users. The first tier is formed by incumbents, specifically Federal and non-Federal primary users. Federal use of the band is by naval radar operating in littoral waters when ships venture close to the continental shoreline. Commercial users are formed by the Fixed Satellite Service in the space-to-earth link to a limited number of protected earth station sites. The second and third tiers are formed by Mobile Broadband (MBB) users operating on a secondary basis. The second tier is based on Priority Access Licenses (PAL) that will be auctioned in a number of license areas in 10 MHz blocks. PAL users must protect incumbents from interference. The third tier is known as General Authorized Access (GAA) and is composed of lightly licensed users who are not guaranteed protection from one another but must protect the higher tiers. Users are given access to spectrum grants by several Spectrum Access Systems (SAS) (e.g., SAS 104 and 106) that individually offer database services and policy management functions on a real-time basis. PAL users are protected within a local deployment known as a PAL Protection Area (PPA) that is registered within the license area. GAA users may request access to PAL spectrum so long as all PPAs are protected from interference. In addition, PAL users are allowed to sub-lease their licensed spectrum to PPAs that are registered on behalf of third parties.

WINNF, "Requirements for Commercial Operation in the U.S. 3550-3700 MHz Citizens Broadband Radio Service Band," WINNF-TS-0112, V.1.4.1, Wireless Innovations Forum, January 2018; WINNF, "CBRS Communications Security Technical Specification," WINNF-TS-0065, V.1.1.0, Wireless Innovations Forum, July 2017; WINNF, "Signaling Protocols and Procedures for Citizens Broadband Radio Service (CBRS): Spectrum Access System (SAS)—Citizens Broadband Radio Service Device (CBSD) Interface Technical Specification," WINNF-TS-0016 V1.2.1, Wireless Innovations Forum, January 2018; and WINNF, "Signaling Protocols and Procedures for Citizens Broadband Radio Service (CBRS): Spectrum Access System (SAS)—SAS Interface Technical Specification," WINNF-TS-0096, V1.2.0, Wireless Innovations Forum, October 2017, present on-going development in the Spectrum Sharing Committee (SSC) of the Wireless Innovations Forum (WlnnForum). These development cover protocols for interaction between Citizens Broadband Radio Service Devices (CBSDs), which are base station units providing broadband service to end-user devices and the SAS. In addition, an additional industry organization, the CBRS Alliance, is developing features that allow base stations implementing LTE to operate as part of a coexistence group of CBSDs that are capable of managing interference in a manner that is specific to the LTE-TDD air interface (CBRSA, "CBRS Network Service Technical Specification," CBRSA-TS-1001 V1.0.0, CBRS Alliance, February 2018; CBRSA, "CBRS Network Service Technical Specification," CBRSA-TS-1002 V1.0.0, CBRS Alliance, February 2018; and CBRSA, "CBRS Coexistence Technical Specification," CBRSA-TS-2001, V1.0.0, CBRS Alliance, February 2018).

However, the existing solutions are not capable of scaling up to the needs of 5G networks, which are being designed to handle a number of novel applications and business models. One such application of interest serves the ongoing fourth industrial revolution, where wireless machine communication is enabling the Industrial Internet of Things (IIoT). Other applications involve the use of wireless access technologies for geographically constrained applications such as Intelligent Transportation Systems (ITS) or confined wireless access for event venues, stadiums etc. Such use may be for short durations of a few hours as well as long term leases that are a subset of the license period for the PAL. While the SAS in the CBRS does allow such use cases to scale up reasonably, it involves centralized authorization by a private entity. The CBRS model creates an artificial value chain for PAL use, where licenses are more likely to be offered to large operators or holding entities, and sub-leasing is carried out on such licenses. The CBRS makes it much more difficult for businesses and enterprises to gain access to licenses for spectrum for very contained deployment, perhaps limited to the bounds of their premises. Many businesses, e g manufacturing industry, will expect ownership of rights to spectrum, and a degree of certainty similar to that available for public cellular network operators.

SUMMARY OF THE INVENTION

One general aspect includes a method in a spectrum owner system, the method including: recording, in a distributed ledger network, an identifier of a list of spectrum resources licensed from a regulatory authority system to the spectrum owner system, where the list of spectrum resources are available to rent to one or more potential customers; receiving, from a spectrum renter system, an authorization request for a spectrum allocation of spectrum resources, where the spectrum allocation includes at least a desired interval of time for usage of the spectrum resources by a radio access network of a spectrum renter, a desired location for usage of the spectrum resources by the radio access network, and one or more additional characteristics of the spectrum resources; negotiating agreement terms for the spectrum allocation; and recording, in the distributed ledger network, a hash of the spectrum allocation, where the spectrum allocation enables the radio access network of the spectrum renter to provide radio access services to one or more wireless network devices according to the characteristics of the spectrum resources for the desired interval of time and the desired location.

One general aspect includes a spectrum owner system including: a non-transitory computer readable storage medium to store instructions, and a processor coupled with the non-transitory computer readable storage medium to process the stored instructions to record, in a distributed ledger network, an identifier of a list of spectrum resources licensed from a regulatory authority system to the spectrum owner system, where the list of spectrum resources are available to rent to one or more potential customers; receive, from a spectrum renter system, an authorization request for a spectrum allocation of spectrum resources, where the spectrum allocation includes at least a desired interval of time for usage of the spectrum resources by a radio access network of a spectrum renter, a desired location for usage of the spectrum resources by the radio access network, and one or more additional characteristics of the spectrum resources; negotiate agreement terms for the spectrum allocation; record, in the distributed ledger network, a hash of the spectrum allocation, where the spectrum allocation enables the radio access network of the spectrum renter to provide radio access services to one or more wireless network devices according to the characteristics of the spectrum resources for the desired interval of time and the desired location.

BRIEF DESCRIPTION OF THE DRAWINGS

The invention may best be understood by referring to the following description and accompanying drawings that are used to illustrate embodiments of the invention. In the drawings:

FIG. 6B is a block diagram illustrating exemplary operations for initializing the wireless service at the spectrum renter location based on the spectrum allocation, in accordance with some embodiments.

FIG. 9 illustrates a flow diagram of exemplary operations for negotiating agreement terms for the spectrum allocation, in accordance with some embodiments.

DETAILED DESCRIPTION

Figure 1:
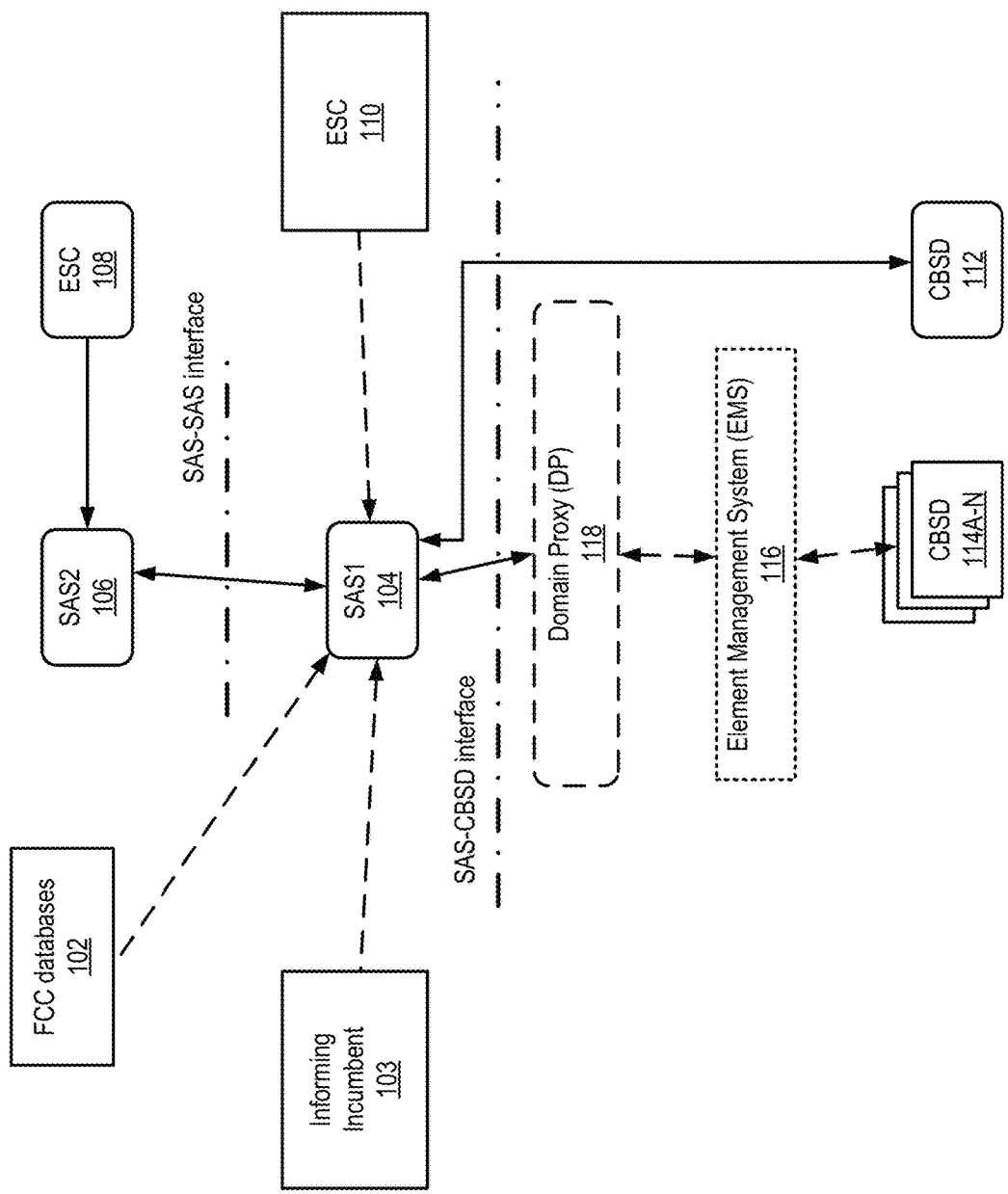
FIG. 1 illustrates a block diagram of an exemplary system for enabling a spectrum marketplace based on an existing centralized approach that maintains databases of current use.

The following description describes methods and apparatus for spectrum allocation using smart contracts. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The field of the embodiments described herein presents methods and apparatuses for enabling spectrum licensing and policy management. This invention proposes a novel solution for a spectrum marketplace that improves spectrum utility and allows valuation of spectrum allocation for wireless broadband use that is commensurate with the availability of spectrum frequencies and the demand for these frequencies. In some embodiments, the solution is applicable to a category of spectrum that is designated for licensing to a class of operators that is different from the class of operators offering commercial mobile radio services. In some embodiments, the techniques described in this invention may be used to create a more flexible and decentralized description of an LSA contract.

The embodiments described herein involve setting up a permissioned distributed ledger (e.g., a blockchain) on which owners of licensed spectrum (e.g., mobile network operators) can contractually assign rights to use the spectrum to industrial customers and others who want to lease access for a fixed authorization period within a restricted space (e.g., an industrial facility such as a manufacture or a data center, etc.). The contract will typically involve the exchange of funds, which could take place either through a standard payment processor, such as a credit card processor or a purchase order, or through a cryptocurrency. In some embodiments, the system presented herein allows IIOT applications to obtain a license for spectrum allocation over a long duration in time. Further, the system can also be used to ensure that a specific spectrum block that is being utilized over a short durations in association with a license is recorded in the distributed ledger.

The embodiments presented herein propose a solution for automated spectrum policy management based on a decentralized authorization mechanism. The present embodiments describe mechanisms for creating a permissioned distributed ledger network between owners of spectrum resources and lessees/renters of the spectrum resources. The distributed ledger network is used to allow authorization of spectrum usage based on a contract that is granted to the lessee (e.g., which is typically a private entity). The proposed solution enables the definition of the contract between the spectrum owner and the spectrum renter based on a number of criteria associated with the use of the granted spectrum resources. The usage criteria include time duration of the contract, spatial confines for usage of the spectrum resources (which may include, in some embodiments, either a perimeter or a set of boundary elements that define a geographical area for protected use of the spectrum resources), the conditions of exclusivity associated with the spectrum usage (such as a guaranteed interference margin in up to e.g. 90-95% of the coverage area, etc.). The proposed solution associates the allocated spectrum resources with an owner of the spectrum, which may be an operator, or a licensee for fixed or mobile satellite service, or the regulatory authority, and automatically enables the spectrum owner to receive payment for the offered spectrum resources through an automated clearing mechanism.

In an embodiment, a method and a spectrum owner system are described. The spectrum owner system records, in a distributed ledger network, a list of spectrum resources licensed from a regulatory authority system to the spectrum owner system, where the list of spectrum resources are available to rent to one or more potential customers. The spectrum owner system receives, from a spectrum renter system, an authorization request for a spectrum allocation of spectrum resources, where the spectrum allocation includes at least a desired interval of time for usage of the spectrum resources by a radio access network of a spectrum renter, a desired location for usage of the spectrum resources by the radio access network, and one or more additional characteristics of the spectrum resources. The spectrum owner system negotiates agreement terms for the desired spectrum allocation; and records, in the distributed ledger network, a hash of the spectrum allocation, where the spectrum allocation enables the radio access network of the spectrum renter to provide radio access services to one or more wireless network devices according to the characteristics of the spectrum resources for the desired interval of time and the desired location.

Figure 2A:
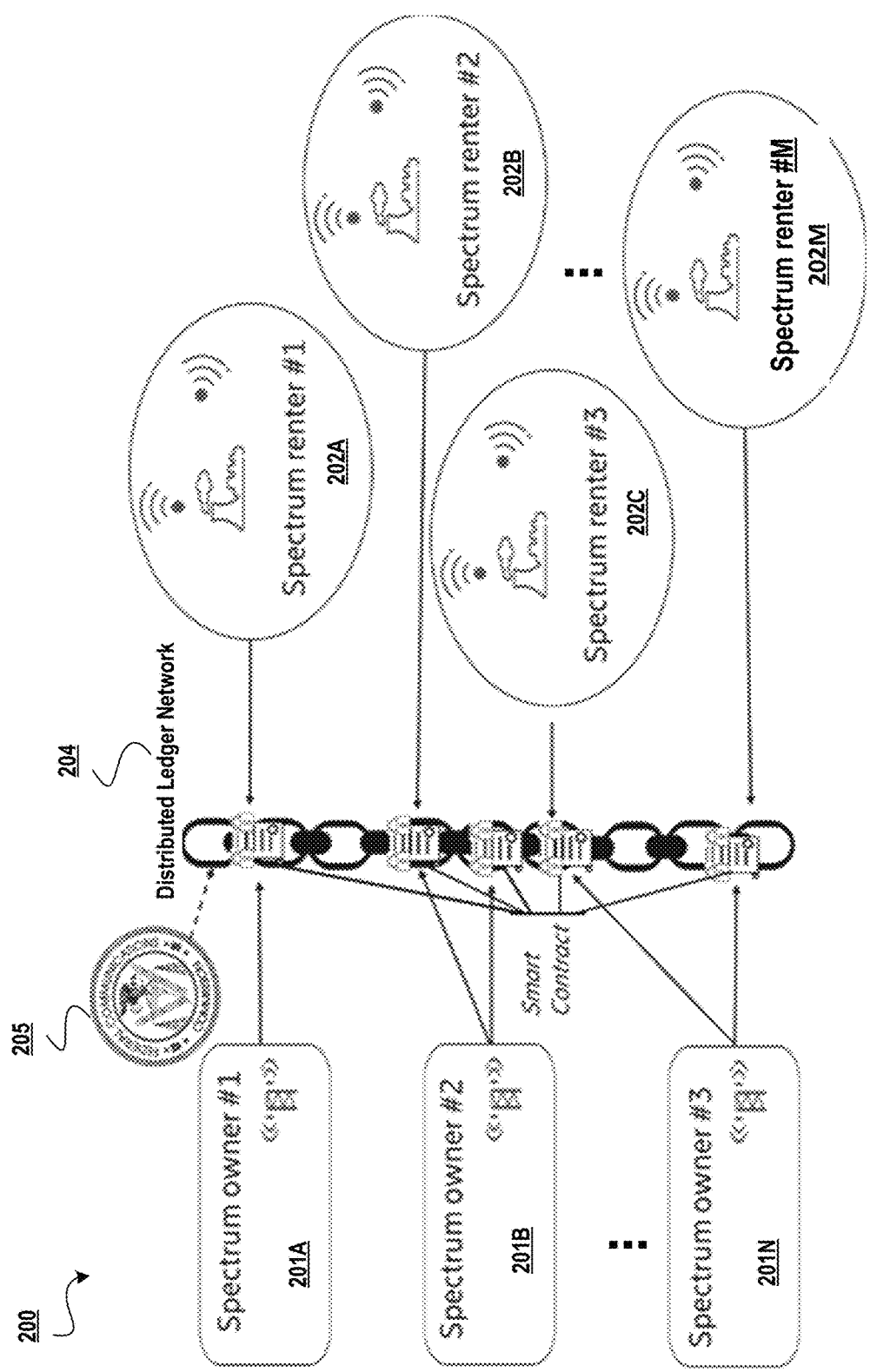
FIG. 2A illustrates a block diagram of an exemplary system for allocation of spectrum resources, in accordance with some embodiments of the invention.

FIG. 2A illustrates a block diagram of an exemplary system for allocation of spectrum resources, in accordance with some embodiments of the invention. The system 200 includes a set of spectrum owners 201A-N, a set of spectrum renters 202A-M, and a distributed ledger network 204, and a regulatory authority 205. Each one of the spectrum owner 201A-N is an entity that own rights to access and distribute spectrum resources. The spectrum resources include a range of radio wave frequencies that are defined for each one of the spectrum owner. The spectrum owners have rights to large blocks of spectrum covering particular geographical areas, which they can subdivide and allocate to one or multiple customers. For example, a spectrum owner can be a mobile network operator. In another example, the spectrum owner may be a national regulator. In another example, the spectrum owner may be composed of a partnership between the regulator and a licensee who is inclined to spare use of the licensed spectrum. Each one of the spectrum owners 201A-N owns a set of physical network devices that are connected through one or more networks. For example, the network devices are connected through local or wide area networks, which can be wired, wireless, or a combination of wired and wireless networks. The network devices enable the spectrum owner to implement the various mechanisms described herein for allocation of the spectrum resources to potential customers. Some of the network devices may implement elements of the distributed ledger infrastructure as it will be described in further details below.

The set of spectrum renters 202A-M are potential customers of the spectrum owners and are interested in obtaining a right of usage of the spectrum resources offered by the spectrum owners 201A-N. The spectrum renters 202A-M can include a collection of industrial/enterprise customers. In some embodiments, each one of the spectrum renters 202A-M has a need for licensed spectrum in a restricted geographical areas for limited periods of time. The spectrum renters 202A-M and the spectrum owners 201A-N form a consortium around a spectrum marketplace. The consortium uses a distributed ledger network 204 to implement a permissioned distributed ledger (e.g., a private blockchain) to connect owners of spectrum resources (which can be referred to as the sellers of the spectrum resources) to renters interested in buying access to the spectrum (which can be referred to as the buyers of the spectrum resources). When a renter/buyer and an owner/seller have reached an agreement on the use of the spectrum resources, the grant of rights for using the spectrum resources from the owner to the renter is formulated as a smart contract and recorded on the permissioned distributed ledger. The smart contract constitutes a grant of right to use spectrum resources that is granted from the spectrum owner (i.e., the grantee of the right) to the spectrum renter (i.e., the recipient of the right). The right to use the spectrum resources is defined for a limited geographic area and for a fixed period of time. The smart contract may further record other aspects of the agreement that is reached between the two parties. For example, the smart contract may describe the exclusivity of use, the guarantee from harm due to interference from other simultaneous use of the spectrum resources, the obligations of the customer in return, etc. Each spectrum renter owns a set of physical network devices that are connected through one or more networks. For example, the network devices are connected through local or wide area networks, which can be wired and/or wireless networks. The network devices enable the spectrum renter to implement the various mechanisms described herein for obtaining a right to use the spectrum resources from the spectrum owners 201A-N. Some of the network devices may implement elements of the distributed ledger infrastructure as it will be described in further details below.

Figure 2B:
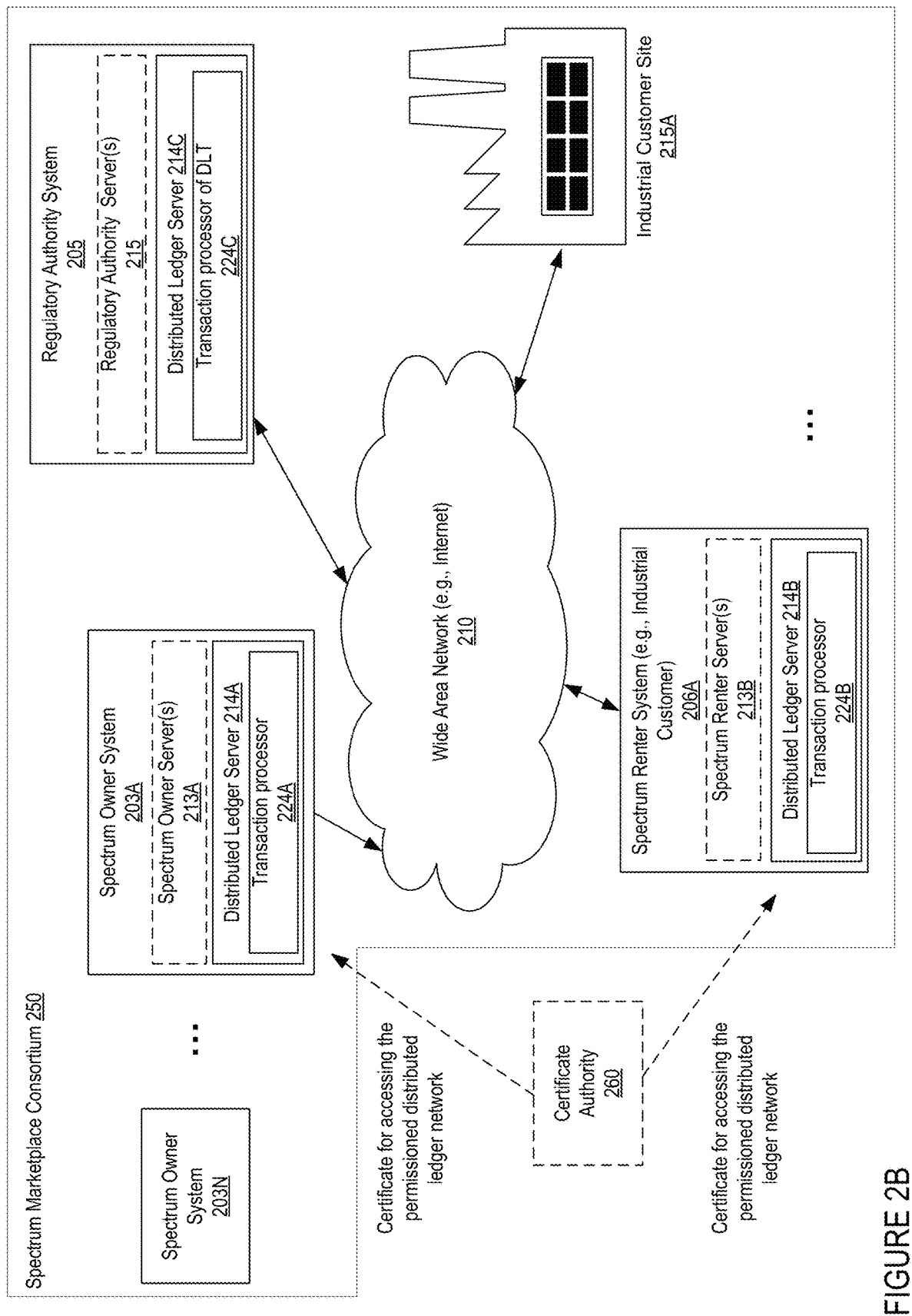
FIG. 2B illustrates a block diagram of exemplary network devices deployed for implementing a spectrum marketplace consortium, in accordance with some embodiments.

FIG. 2B illustrates a block diagram of exemplary systems deployed for implementing a spectrum marketplace consortium 250, in accordance with some embodiments. The spectrum marketplace consortium 250 (which is also referred to as the consortium) includes one or more spectrum owner systems 203A-N, one or more spectrum renter system (s) 206A-M, a regulatory authority system 205. Each one of the spectrum owner systems 203A-N is owned and/or operated by a respective spectrum owner 201-AN. Each one of the spectrum renter systems 206A-M is owned and/or operated by a respective spectrum renter 202A-M. The regulatory authority system 205 is owned and/or operated by the regulatory authority 205.

Each one of the respective spectrum owners owns and operates one or several hardware servers. The servers are network devices that are communicatively coupled to one another and are connected to a wide area network (e.g., the Internet). In some embodiments, one or more servers run a transaction processor of a distributed ledger (e.g., blockchain transaction processor). In some embodiments, the servers of a spectrum owner can be located in a datacenter. For example, a first spectrum owner 201A may own a spectrum owner system 203A, which includes a distributed ledger server 214A and one or more optional spectrum owner server(s) 213A. The servers 214A and 213A may be located in the same physical vicinity or alternatively distributed over a geographical area. The distributed ledger server 214A includes a transaction processor 224A. While the illustrated example shows a transaction processor 224A implemented on a server 214A, in other embodiments, the transaction processor 224A may be distributed over multiple servers.

Similarly, each spectrum renter (which can be an industrial customer) that participates in the spectrum marketplace owns and operates one or more servers. One or several of the servers run a distributed ledger transaction processor. For example, a first spectrum renter 202A may own a spectrum renter system 206A, which includes a distributed ledger server 214B and one or more optional spectrum renter server(s) 213B. The servers 214B and 213B may be located in the same physical vicinity or alternatively distributed over a larger geographical area. The distributed ledger server 214B includes a transaction processor 224B. While the illustrated example shows a transaction processor 224B implemented on a server 214B, in other embodiments, the transaction processor 224B may be distributed over multiple servers. The spectrum renter 202A may also own an industrial site such as industrial customer site 215A. The industrial customer site 215A is located in a geographical location in which the spectrum resources provided by the spectrum owner 201A are to be used. In some embodiments, the site 215A may be located at a geographical location that is separate from the location of the spectrum renter system 206A. In other embodiments, the spectrum renter system 206A may be located in the vicinity of the site 215A. In some embodiments, the site 215A may include one or more additional network devices that are part of the spectrum renter system 206A and which are located within the site 215A. The additional network devices can be used to deploy the spectrum rights granted and monitor the usage of the spectrum resources.

The consortium 250 includes a regulatory authority system 205 maintained by the regulatory authority 205. The regulatory authority system 205 includes a distributed ledger server 214C and one or more optional regulatory authority server(s) 215. The servers 214C and 215 may be located in the same physical vicinity or alternatively distributed over a larger geographical area. The distributed ledger server 214C includes a transaction processor 224C. While the illustrated example shows a transaction processor 224C implemented on a server 214C, in other embodiments, the transaction processor 224C may be distributed over multiple servers. The distributed ledger 214C can be used for monitoring purposes. The regulatory authority 205 maintains a passive presence on the distributed ledger network, to monitor the use of the spectrum resources. For example, the regulatory authority 205 may intervene in case any disputes arise about the use of spectrum between spectrum owners and spectrum renters.

The spectrum owner systems 203A-N, the spectrum renter systems 206A-M, the regulatory authority system 205, and the site 215A are coupled to one another through a wide area network (e.g., Internet) 210. In some embodiments, the systems 203A-N, 206A-M, 205 can be optionally located in one or more datacenter(s). The systems 203A-N, 205, and 206A-M are operative to perform the operations described below in FIGS. 3-9 to negotiate the spectrum licenses. The distributed ledger servers 214A-C are part of the distributed ledger network 204 that is used to implement the spectrum marketplace.

The distributed ledger network 204 includes a set of distributed ledger network nodes coupled to one another through wired or wireless communication link. The distributed ledger nodes are operative to process transactions, perform validation and consensus procedures in the distributed ledger network. In the embodiments described herein, the distributed ledger network 204 is illustrated as a network element 204. This network element includes several network nodes communicatively coupled and an operation performed by the distributed ledger network 204 can be performed by one or multiple distributed ledger network nodes and may involve several sub-operations or communications between the multiple nodes (which may not be illustrated).

The consortium 250 running the distributed ledger network 204 runs a permissioning procedure that enables the vetting of any new spectrum owner or spectrum renter that wants to join the consortium 250. During the permissioning procedure a potential spectrum owner or a potential spectrum renter/customer is vetted to ensure that they have legitimate interests in participating in the spectrum marketplace. For a spectrum owner to join the consortium they need to provide documentation that they have been granted authorization by the governing regulatory authority 205 to use the spectrum. For example, the spectrum owner may need to provide a copy of their license to the governing regulatory authority 205. In some embodiments, the spectrum renter needs to provide evidence that they have facilities in the geographical region of interest, in which the spectrum resources are requested. Parties in both categories (spectrum owner and spectrum renter) need to obtain public key certificates from a certificate authority 260 (e.g., certified PKI). The distributed ledger network 204 (including the nodes 214A-C) keeps a record of the certificates whose owners have been approved to be members of the consortium, and the certificate of a node joining the network is checked against the approved list. If the certificate is not on the approved list, the node's request to join the network is rejected. A party joining the consortium 250 deploys a distributed ledger server in their system (e.g., a node of a data center). In some embodiments, the distributed ledger server utilizes a public/private key pair to perform public key authentication when the distributed ledger server connects with the consortium distributed ledger network. This procedure ensures that all parties accessing the distributed ledger network have a legitimate interest in maintaining a well-functioning spectrum marketplace, and therefore have a high probability of not disrupting the proceedings.

Distributed ledger networks, such as Blockchains, use consensus mechanisms to decide what records get written to the distributed ledger database(s) (i.e., permanent storage of the distributed ledger network). Once written to permanent storage, the record is effectively immutable and cannot be deleted. Unlike unpermissioned distributed ledgers (e.g., unpermissioned blockchains), permissioned distributed ledgers (e.g., permissioned blockchains) don't need energy and time consumptive algorithms to achieve consensus. A partial byzantine consensus (PBC) algorithm such as Tendermint or Raft is sufficient. Depending on the minimum time period allowed for a spectrum allocation rights grant and the number of potential customers in a geographical area, the performance of the consensus algorithm need not necessarily be high. For example, if the minimum length of a rights grant is 24 hours and the number of customers is on the order of 100, then a performance of a few transactions per hour is probably sufficient. Most PBC algorithms have transaction performance on the order of 100-1000 per second. In actual practice, the duration of a contract will vary between a few hours to a few years, with a majority of contracts tending to be long-term.

Figure 2C:
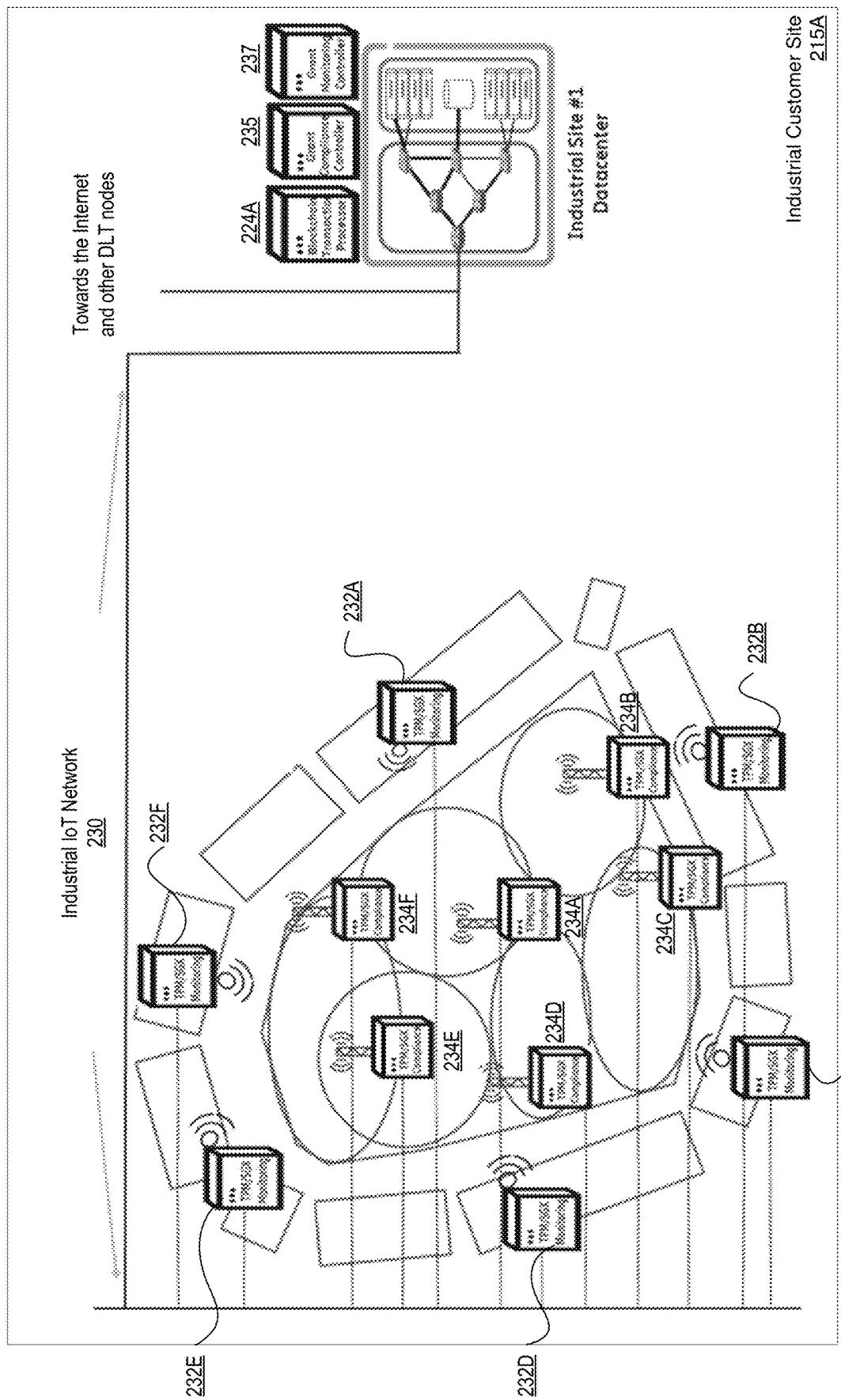
FIG. 2C illustrates a block diagram of exemplary network devices deployed for enabling compliance and monitoring of spectrum resources allocation based on a distributed ledger, in accordance with some embodiments.

FIG. 2C illustrates a block diagram of exemplary network devices deployed for enabling compliance and monitoring of spectrum resources allocation based on a distributed ledger, in accordance with some embodiments. In some embodiments, the system is deployed in a factory site of a spectrum renter. For example, the site is the industrial customer site 215A. The exemplary industrial site 215A includes access points 234A-F and monitoring network devices 232A-F. The access points 234A-F can be base stations of a wireless network. In other embodiments, the access points can be any other type of network device that is operative to provide radio access to one or more wireless network devices. The industrial site 215A may further include one or multiple wireless network devices (not illustrates) that are operative to connect to the base stations to receive and transmit data through the allocated spectrum resources. For example, the wireless network devices can be part of an industrial Internet of Things (IoT) network 230.

The monitoring network devices can be interchangeably referred to as monitoring stations. The monitoring network devices 232A-F are operative to monitor the usage of the spectrum resources and ensure that the usage is performed based on the license granted to the spectrum renter. The monitoring network devices 232A-F can belong to the spectrum renter or to the spectrum owner. In some embodiments, each one of the monitoring network devices 232A-F includes software and hardware that is agreed upon by both the spectrum renter and the spectrum owner that enables the monitoring device to be trusted by all parties (i.e., the spectrum renter, the spectrum owner, and the regulatory authority). The radio access network, which includes one or multiple access points such as access points 234A-F, in the spectrum renter's facility (e.g., site 215A) can also include the monitoring network devices 232A-F. The access points 234A-F and the monitoring network devices 232A-F are secured in a way such that tampering is deterred. Using a hardware-based security mechanism such as the Trusted Platform (TPM), the integrity of the monitoring and compliance can be ensured by wrapping the private keys for the access points and the private keys of the monitoring network devices through the TPM and storing them in the TPM's tamper proof memory. The process of activating and terminating the spectrum allocation at the agreed upon times, and for monitoring compliance in terms of the frequency and power radiated by the access points can be accomplished by a module running in an encrypted enclave in processor memory of the access points or the monitoring network devices. For example, the encrypted enclave can be a Software Guard Extension (SGX). When the code is moved from the encrypted enclave into the cache of the processor for execution, it is decrypted. This prevents any tampering with the code by higher privileged software (such as the operating system). The encrypted enclave unwraps the private keys from the TPM whenever they need to be used.

In some embodiments, the monitoring network devices are positioned at the periphery of the geographical area, such as within the protection boundary elements associated with limiting interference, to ensure that the power flux density in those regions does not exceed the localized frequency bounds of the allocated spectrum resources. Measurements of signals from the access points and the monitoring network devices are stored in a measurements database and a hash of these measurements is recorded in the distributed ledger network. In case of any dispute, the spectrum owner and the spectrum renter can consult the records, or, if some other entity is a party to the dispute, the regulatory authority can audit the records to determine whether any violation of the spectrum allocation occurred.

Compliance of each part of the spectrum allocation may be aided by modeling of propagation in the region of interest, and through periodic auditing of models via measurements. In some embodiments, the measurements can be optionally recorded into the distributed ledger network by the monitoring network devices to ensure that they are available to the spectrum owner and the regulatory authority.

In some embodiments, the radio base stations 234A-F and the monitoring network devices 232A-F are outfitted with Trusted Platform Module (TPM)/Software Guard Extension (SGX)-implemented software. The access points 234A-F are outfitted with TPM/SGX compliance modules enable the access points 234A-F to securely receive radio parameters from the grant compliance controller 235 and to securely configure the radio transceivers according to the received parameters. In some embodiments, the access points 234A-F may optionally include the monitoring network devices (232A-F) if monitoring at the access points is desired. The monitoring network devices 232A-F are outfitted with TPM/SGX monitoring modules which periodically take radio measurements and report them back to the grant monitoring controller 237 for recording on the distributed ledger database(s). In some embodiments, the monitoring network devices 232A-F are positioned around the perimeter of a geographical area, in which the spectrum resources are offered, and periodically perform the radio measurements.

The industrial site may further include one or several network devices that are operative to handle configuration and control of the grant of spectrum resources. The server(s) or datacenter are connected to the Internet. A distributed ledger transaction processor (e.g., 224A) handles communication between other nodes of the distributed ledger and the local users of the spectrum resources (e.g., IoT network devices). A grant compliance controller 235 handles translation of the rights grant delegation details from the distributed ledger transaction processor 224A into radio base station configuration parameters and communicates them in a secure manner to the radio base stations 234A-F. A grant monitoring controller 237 handles collecting monitoring measurements from the monitoring network devices 232A-F in a secure manner and communicates them to the distributed ledger transaction processor 224A for insertion into the distributed ledger database(s).

Figure 3:
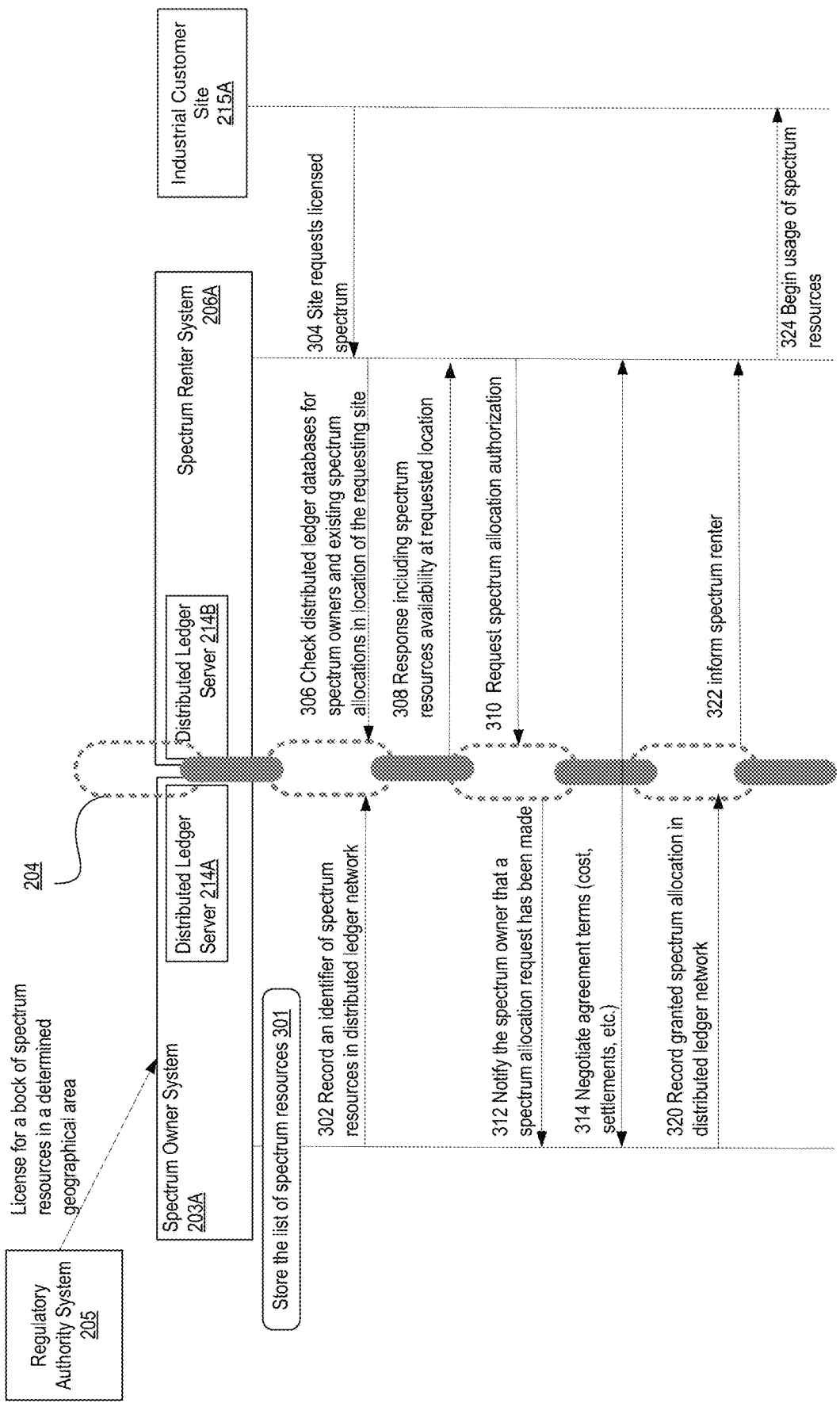
FIG. 3 illustrates an exemplary procedure for issuing a rights grant delegation to a renter of spectrum resources, in accordance with some embodiments.

FIG. 3 illustrates an exemplary procedure for issuing a rights grant delegation to a renter of spectrum resources, in accordance with some embodiments. A spectrum owner receives a license from the regulatory authority 205 that is located in its jurisdiction. The license obtained is for a particular block of spectrum in a determined geographical area. The geographical area can span a large area in which the spectrum owner can access and grant spectrum resources to one or multiple spectrum renters for various periods of time. At operation 301, the list of spectrum resources is stored. For example, the list of spectrum resources can be stored on a web site or in a file accessible to the members of the spectrum allocation consortium.

At operation 302, the spectrum owner records an identifier of a list of the spectrum resources licensed from the regulatory authority 205 on the distributed ledger network 204. For example, the spectrum owner system 203A, through the distributed ledger server 214A may record a hash of the list of spectrum resources in the distributed ledger network 204. The spectrum owner can record a transaction including the spectrum owner's identifier, the geographical area in which the spectrum resources are licensed, the characteristics of the spectrum resources. The characteristics of the spectrum resources such can include the frequency range, power levels authorized, limitations on the interference footprint of the authorized transmitters at the property-boundary, the authorized start time of the contract, and the duration of authorized use. These characteristics are not limiting and are provided as examples. Also, it will be clear to one well versed in the art that additional characteristics can be contemplated such as representation of period of the contract as a start time and a termination time. The spectrum owner is then operative to grant rights of usage of these spectrum resources to one or multiple renters for specific interval of times. As it will be discussed below, as geographically and temporally restricted spectrum usage rights grants (which can be referred to as spectrum allocations) are delegated to customers/renters, the spectrum owner 201A includes those as part of the listing that is recorded in the distributed ledger network 204.

A spectrum renter system 206A such as an industrial/enterprise company looking for spectrum for a facility (e.g., site 215A) in a particular geographical area checks listings in the distributed ledger databases to see if the area in which they need spectrum has an allocation already established. For example, a spectrum renter system 206A may receive a request, operation 304, from an industrial customer site 215A for spectrum resources at the location of the site 215A. In some embodiments, a manager of the site 215A may use a user interface to enter one or more characteristics of the spectrum resources needed at the location of the site 215A. For example, these may include the location of the site, the time period for which the spectrum resources are needed, and one or more additional characteristics defining the physical characteristics of spectrum resources (e.g., frequency, bandwidth). Upon receipt of the request from the site 215A, the spectrum renter system 206A accesses the stored network resources to determine whether the requested spectrum resources are available for rent. The spectrum renter system 206A further accesses the distributed ledger to retrieve the hash of the list of network resources to determine the authenticity of the list of available resources. The spectrum renter system 206A obtains a response, at operation 308, including the spectrum resources availability at the requested location. In some embodiments, the requested spectrum resources may not be available. For example, there is no owner that can allocate spectrum resources at the desired location. Alternatively, all owners of spectrum resources may have already allocated all the resources for the desired period of time at that location and no resources are available. In that case, the response including the spectrum resources availability may include an indication that no spectrum resources are available for the desired location or period. Alternatively, the distributed ledger server 214B may return that the requested spectrum resources are available. For example, the response 308 may include the identifier of the spectrum owner that can offer the requested spectrum resources. The identifier of the spectrum owner uniquely identifies the spectrum owner system 203A in the distributed ledger network 204. In some embodiments, the distributed ledger server 214B determines that no allocation for the requested network resources has been recorded/listed in the distributed ledger network and may return in the response 308 that the spectrum resources are available. Upon receipt of the response 308 that there is availability of the spectrum resources, the spectrum renter system transmits, at operation 310, a request for spectrum allocation through the distributed ledger network. The allocation request is signed by the spectrum renter system to enable authentication in the distributed ledger network of the spectrum renter making the request.

The spectrum owner is notified, at operation 312, that a customer has requested a spectrum allocation. For example, the spectrum owner system 203A receives through the distributed ledger server 214A a request for the spectrum allocation. The request for the spectrum allocation includes the requested location, the requested time period, and one or more additional characteristics of the spectrum resources needed for the site 215A. The renter and the owner then undergo a negotiation process, at operation 312, on a private part of the distributed ledger network for determining the terms of the agreement. In the private channel that is established between the spectrum owner and the spectrum renter, access to transactions is restricted only to the parties that have been authenticated as part of the negotiation process. The spectrum owner system and the spectrum renter system perform several operations through private transactions in the distributed ledger network to negotiate the agreement terms of the spectrum usage. These terms may include the price of the spectrum, settlement means, and provision of settlement credentials (like a purchase order number, credit card number, or cryptocurrency account address). Once the terms of the agreement are settled, the spectrum usage rights grant (spectrum allocation) that is signed by both the spectrum owner system 203A and the spectrum renter system 206A is recorded, at operation 320, on the distributed ledger network. When the granted spectrum allocation right is recorded in the distributed ledger network 204, the spectrum renter system 206A receives, at operation 322, a notification that the recordation has been completed and may initiate the usage of the spectrum resources at the site 215A (operation 324).

Figure 4:
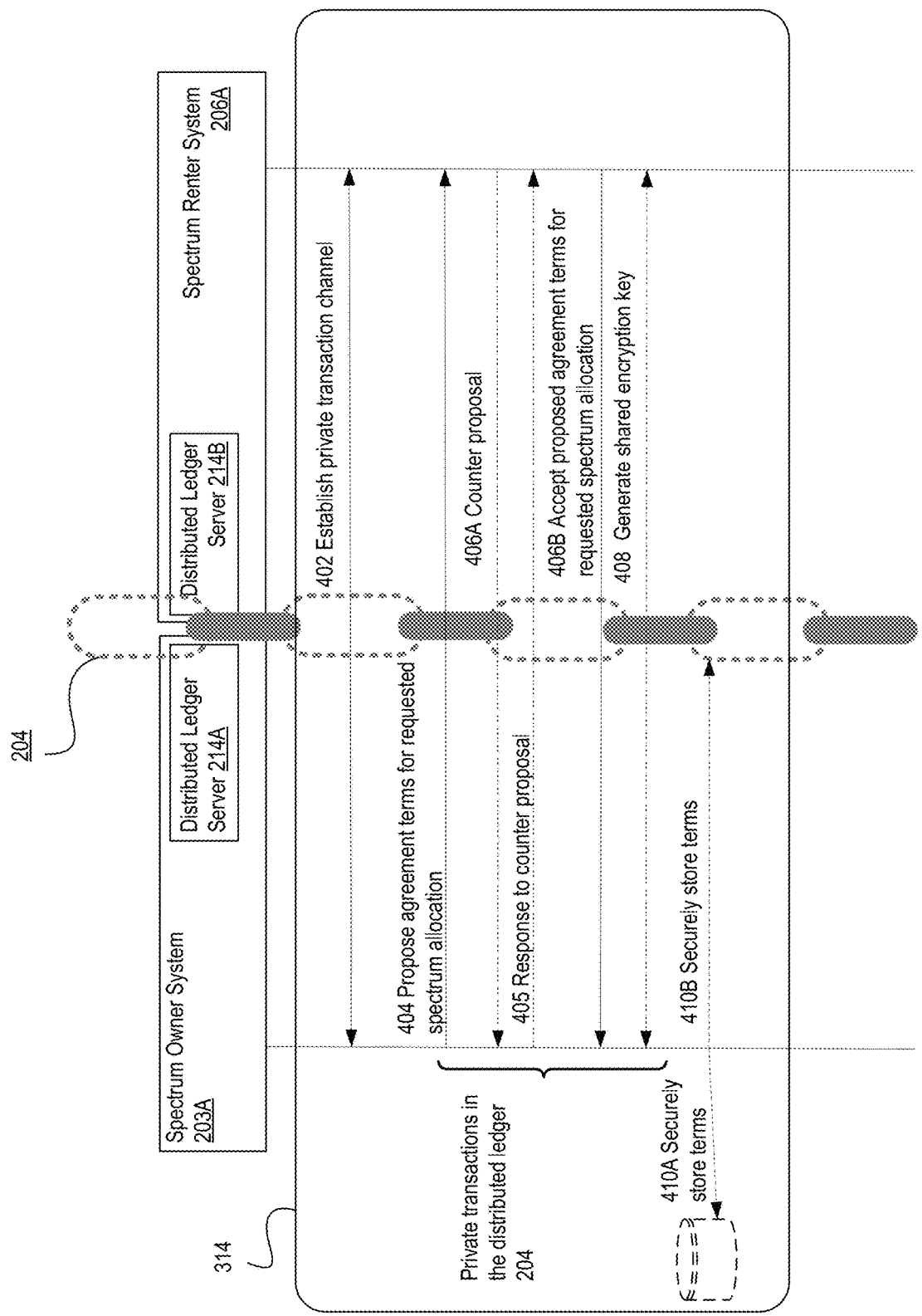
FIG. 4 illustrates exemplary operations for performing the agreement negotiation between a potential spectrum renter and a spectrum owner, in accordance with some embodiments.

FIG. 4 illustrates exemplary operations for performing the negotiation between a potential spectrum renter and a spectrum owner, in accordance with some embodiments. The two parties (spectrum owner and prospective customer) establish a private transaction channel, at operation 402, according to the particular blockchain system they are using. The private transaction channel enables each one of the transaction processors of the respective distributed ledger server 214A and distributed ledger server 214B to communicate by posting private transactions to the distributed ledger 204. The private transactions are accessible to the spectrum owner system and the spectrum renter system. These private transactions are not accessible to others than the spectrum renter or the spectrum owner.

Once the private transaction channel is established, communication between the spectrum owner system 203A and the spectrum renter system 206A can be performed. The spectrum owner sends a proposal for a rights grant allocation (which may be the same proposal initially sent by the customer) along with a proposal for the terms of the agreement, at operation 404. Both proposals are signed with the spectrum owner's public key. The prospective customer then either makes a counterproposal (operation 406A) or accepts the offer (operation 406B), indicating acceptance by countersigning the proposal with its private key. In some embodiments, when the spectrum renter system 206A makes the counter proposal (operation 406A), the spectrum owner system 203A respond to the counter proposal, at operation 405, by accepting or denying the counter proposal. In some embodiments, the response to counter proposal can include a new set of terms for the requested spectrum allocation or a modified spectrum allocation with different characteristics than the requested spectrum allocation. For example, the spectrum owner system 203A may propose a modified period of spectrum allocation for a different price point to the spectrum renter system 206A. Other differences between the requested spectrum allocation and the modified spectrum allocation can be proposed. At operation 406B, the spectrum renter system 206A accepts the proposed terms and transmits the them to the spectrum owner system 203A through recordation of a private transaction in the distributed ledger 204.

The two parties then generate a shared key, at operation 408. In some embodiments, the shared key can be generated using, for example, the Diffie-Hellman key exchange protocol for a symmetric encryption algorithm, for example the Advanced Encryption Standard (AES) algorithm. In other embodiments, the shared key can be generated through other cryptographically secure algorithms. In some embodiments, the generation of the shared key can be performed at a different time by the spectrum renter system 206A and the spectrum owner system 203A. For example, the generation of the key can be performed prior to the establishment of the private transaction channel and can be performed through the transactions of the distributed ledger that are not private. In some embodiments, the spectrum renter system and the spectrum owner system can use Diffie-Hellman protocol to generate a shared key. In other embodiments, the spectrum allocation consortium may request participants to create a root key, e.g., using the Global System for Mobile Communications (GSMA) key hierarchy using a soft subscriber identity module (SIM), and the spectrum owner system and the spectrum system may create pair-wise a shared key.

The agreement terms are encrypted with the shared encryption key and stored either on the distributed ledger network, operation 410B, (if enough storage is available) or in network accessible storage, operation 410A, that is separate from the distributed ledger. For example, the financial proposal can be stored in a distributed file system that connects all nodes of the distributed ledger network with the same system of files such as the Inter Planetary File System (IPFS). In other embodiments, the terms of the agreement can be stored in a centralized database that is maintained by the spectrum consortium. In other embodiments, the terms can be stored in the distributed ledger network (e.g., blockchain). In some embodiments, the agreement terms include financial terms.

A rights grant delegation containing the customer's rights to use the spectrum allocation is formulated and written to the distributed ledger. The rights grant delegation contains a link (for example a URL or smart contract address) to the terms associated with the right grant delegation. In some embodiments, the right grant delegation or spectrum allocation is stored along the terms (in the storage or i the distributed ledger network).

The right grant delegation authorization for spectrum allocation (which can also be referred to herein as the spectrum allocation) includes one or more parameters that define the spectrum usage allocated from the spectrum owner to the spectrum renter. In some embodiments, a spectrum allocation may contain the following spectrum allocation parameters: the width of the frequency of the allocated spectrum resources (e.g., in MHz); the starting and ending frequencies (e.g., in GHz); the location (a street address and/or detailed latitude longitude co-ordinates at the center of the area). The spectrum allocation parameters can further include coverage area that indicates the geographical area that is to be covered by the spectrum allocation.

Figure 5:
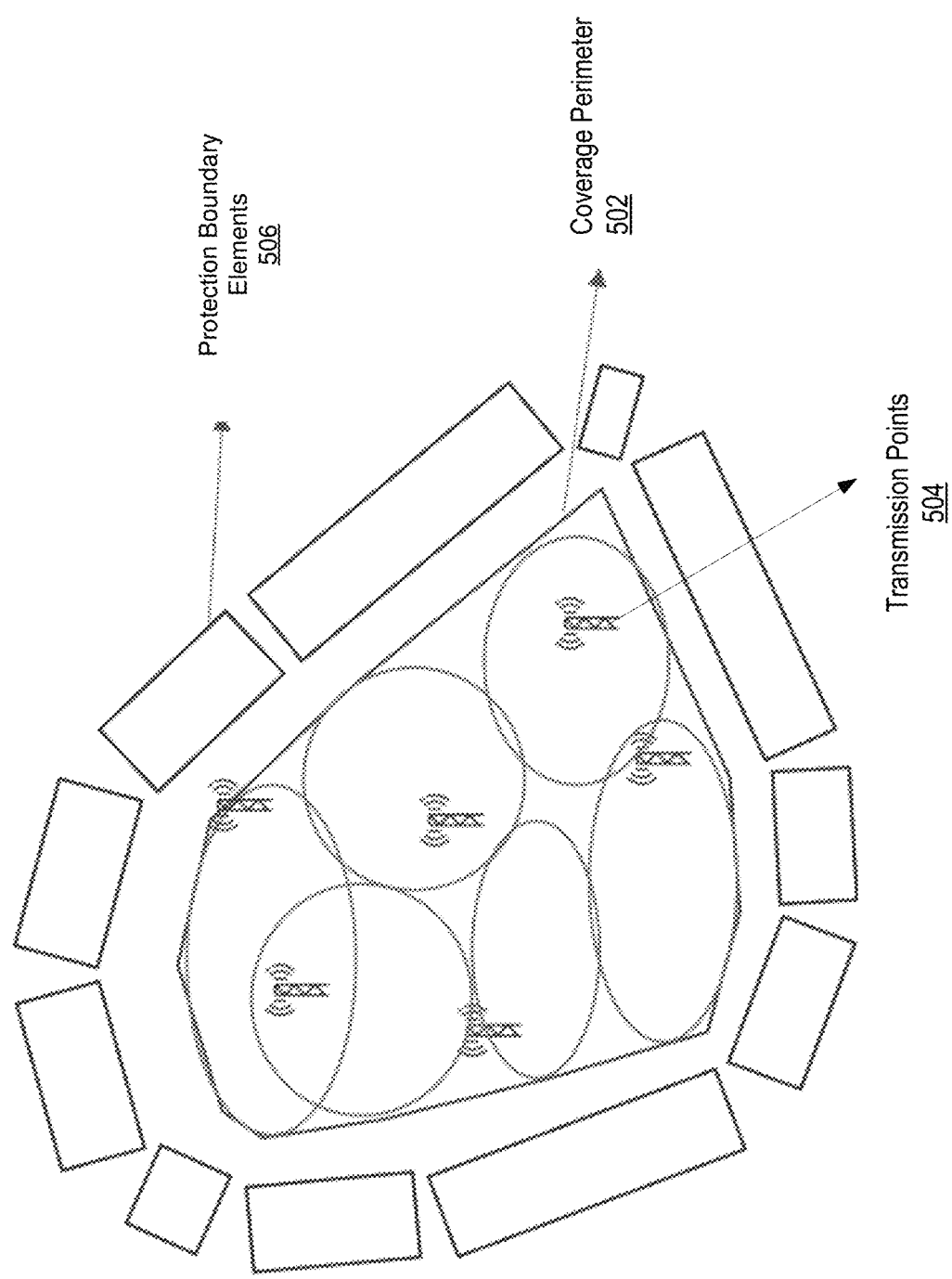
FIG. 5 is a block diagram illustrating exemplary coverage area and protection boundaries, in accordance with some embodiments.

FIG. 5 is a block diagram illustrating exemplary coverage area and protection boundaries, in accordance with some embodiments. In some embodiments, the coverage area can be identified as a coverage perimeter 502 (e.g., a polygon) around the location in which the recipient is allowed to radiate with the amount of power permitted by the license granted to the spectrum owner by the regulatory authority, or alternatively to the perimeter a record of the exact geolocation coordinates of deployed transmission sites (e.g., access points such as radio base stations 504). In some embodiments, the location information may simultaneously include the coverage perimeter and the coordinates corresponding to the authorized transmission points.

The spectrum allocation parameters may further include a mission profile. The mission profile indicates the coverage objectives of the deployment. For example, the coverage objectives may indicate whether the objective is local coverage, point-protection for a number of fixed reception coordinates, and whether the objective is coverage (implying interference insensitive operation), capacity (high bandwidth, variable performance), or performance (low bandwidth, exclusive access to guaranteed capacity).

In some embodiments, the spectrum allocation parameters may further include a collection of protection boundary elements 506. In some embodiments, the protection boundary elements can be polygons around the coverage perimeter. A collection of polygons adjacent to the location coverage perimeter within which the aggregated received power needs to decrease below some threshold (say −108 dBm/10 MHz) with a sufficiently high probability (e.g. 95%) to become effectively undetectable by a suitable probe antenna (e.g., a dipole at a height of 1.5 m above ground, a Yagi-Uda probe antenna with defined gain (e.g. 12 dBi) at a height of e.g., 20 m above ground, etc.). These protection boundary elements constitute a geographical guard area that limits interference between the grant recipient's transmission and transmissions from any neighboring grants. For example, in the case of the CBRS band, such a guard is artificially established by prevention of reuse by a third party up to a contour representing a fixed receive level close to the sensitivity of the receivers expected to be used, viz. −96 dBm—this coverage area is however protected from interference that will exceed a higher threshold, viz. −80 dBm, a level that is impractical relative to the sensitivity level for communication using commercial technology. Either of these mechanisms may be used, although the use of guard polygons, also known as Dynamic Protection Areas (DPA), is more general and flexible across different use cases, as it potentially allows spatial averaging of local terrain effects while evaluating compliance.

The spectrum allocation parameters may include additional contract details such as terms on mobility, bandwidth usage and loading of spectrum. The spectrum allocation parameters may include a starting time and ending time for the spectrum allocation grant (e.g., the time endpoints (start and end time) can be indicated coordinate universal time—UTC).

The spectrum allocation parameters may include a location (e.g., a URL pointing to a web page) where radio measurements for the location are recorded and future measurements during the term of the spectrum allocation period will be recorded. These measurements allow a regulator to audit the grant during and after the term of the lease to ensure that the restrictions associated with the global spectrum allocation license are maintained.

The spectrum allocation parameters may further include a link to the encrypted terms. The spectrum allocation parameters may further include an indication of whether the rights grant recipient can subdelegate the grant and, if so, how many times in total the grant can be subdelegated. Subdelegation occurs if the spectrum renter chooses to delegate the allocated spectrum resources to another party. In some embodiments, the sub-delegation can occur for the entire term of the leased spectrum resources. In other words, in these embodiments, the recipient (i.e., the spectrum renter)

is not permitted to break the grant into smaller pieces and subdelegate it to other entities. In some embodiments, the spectrum owner can prohibit sub-delegation of the allocated spectrum resources. In other embodiments, the spectrum owner can allow sub-delegation of the allocated spectrum resources. The sub-delegation rights are stored as part of the spectrum allocation parameters.

Figure 6A:
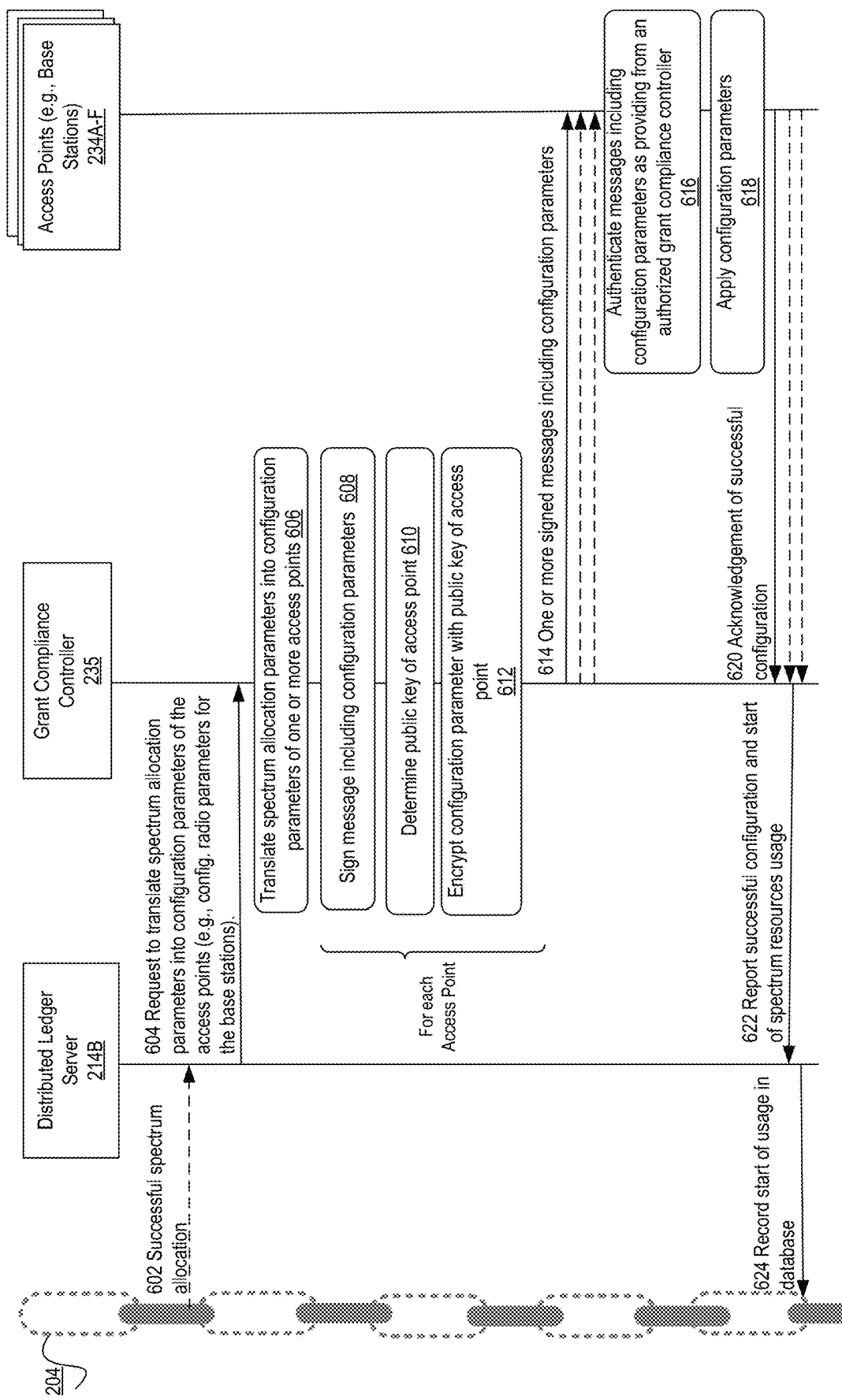
FIG. 6A is a block diagram illustrating exemplary operations for initializing the wireless service at the spectrum renter location based on the spectrum allocation, in accordance with some embodiments.

FIG. 6A is a block diagram illustrating exemplary operations for initializing the wireless service at the spectrum renter location based on the spectrum allocation, in accordance with some embodiments. Upon grant of the spectrum allocation from a spectrum owner to a spectrum renter, the operations of FIG. 6A are performed to enable configuration of one or more access points (e.g., base stations) that are to be used by wireless network device (e.g., IoT devices) to connect via the spectrum resources as defined in the spectrum allocation recorded in the distributed ledger 204. When the rights grant delegation of the spectrum resources is finalized, the distributed ledger server (e.g., the transaction processor 224B (e.g., a blockchain processor) of the distributed ledger server 214B) communicates the details of the spectrum allocation to a grant compliance controller 235. The grant compliance controller 235 can be running on the site server. In some embodiments, the grant compliance controller 235 may be located separately from the distributed ledger server 214B. The grant compliance controller 235 can be located at the site at which the spectrum resources are to be used. The grant compliance controller 235 translates the rights delegation (i.e., the spectrum allocation) into parameters for configuring the radio base stations according to the radio protocol (e.g., LTE, etc.) for which the grant was negotiated. For example, the distributed ledger server 214B may receive a confirmation of successful spectrum allocation, at operation 602. The grant compliance controller 235 receives a request 604 from the distributed ledger server 214B. The request 604 is a request to translate spectrum allocation parameters of the spectrum usage right granted to the spectrum renter from the spectrum owner into the configuration parameters for the access points. The grant compliance controller 235 translates, at operation 606, the spectrum allocation parameters into the configuration parameters of one or more access points at operation 606. The one or more access points are access points managed by the spectrum renter and enables one or several wireless network devices to connect via the spectrum resources to the access points. For example, the grant compliance controller 235 may determine based on the type of radio protocol run by the access points configuration values one or more of the frequency range, power levels authorized, limitations on the interference footprint of the authorized transmitters at the property-boundary, the authorized start time of the contract, the end time or the duration of authorized use, etc.

In some embodiments, the grant compliance controller 235 signs the message including the configuration parameters with its private key, at operation 608. The grant compliance controller 235 determines for each access point, at operation 610, a public key associated with the access point. At operation 612, for each access point, the grant compliance controller 235 encrypts the message including the configuration parameters with the public key associated with the access point. At operation 614, the grant compliance controller transmits the message including the configuration parameters to the base station. The grant compliance controller 235 may transmit one or more additional message to one or more access points. Each message includes configuration parameters for configuring the respective access point receiving the configuration parameters and enables the access point to transmit/receive data from one or more wireless network devices according to the spectrum resources allocated to the spectrum renter. In some embodiments, the configuration parameters are adapted based on the access point being configured. Each access point can receive a different set of parameters. Each of the configuration parameters enable the respective access point to comply with the characteristics of the spectrum resources allocated to the spectrum renter.

Upon receipt of the message including the configuration parameters, each one of the access points 234A-F performs the operations 616-618. At operation 616, each one of the access points 234A-F authenticates the message received from the grant compliance controller 235. The authentication is performed by determining that the signature of the message is a valid signature of the grant compliance controller 235. In some embodiments, within an SGX enclave, the access point (e.g., base station) checks the signature of the grant compliance controller. The access point 234A decrypts the message using its private key. For example, the access point 234A may unwrap a TPM wrapped private key of the access point to decrypt the message. At operation 618, each one of the access points 234A-F configures the radio according to the configuration parameters in the message. At operation 620, the access point (e.g., base station) informs the grant compliance controller 235 that the radio is programmed. For example, the access point 234A may transmit an acknowledgment of successful configuration to the grant compliance controller 235. When all access points have reported back, the grant compliance controller 235 transmits a report of successful configuration to the distributed ledger server, at operation 622. In some embodiments, the report back is performed upon determining that the grant start date has been reached (i.e., the start date and time at which the spectrum renter can start using the allocated spectrum resources). Upon receipt of the report, the distributed ledger 214B records, at operation 624, the start of the usage of the allocated spectrum resources into the distributed ledger 204. The distributed ledger server 214B write a transaction into the distributed ledger 204.

In some embodiments, the spectrum allocation may also cause configuration of the monitoring network devices (e.g., 232A-F), in order to configure the measurements that should be taken and the period of measurement. In that case, the operations of FIG. 6B can be used to configure the monitoring network devices 232A-F.

FIG. 6B is a block diagram illustrating exemplary operations for initializing the wireless service at the spectrum renter location based on the spectrum allocation, in accordance with some embodiments. Upon grant of the spectrum allocation from a spectrum owner to a spectrum renter, the operations of FIG. 6B are performed to enable configuration of one or more monitoring network devices (e.g., monitoring NDs 232A-F) that are to be used to monitor the usage of the spectrum resources as defined in the spectrum allocation recorded in the distributed ledger 204. When the rights grant delegation of the spectrum resources is finalized, the distributed ledger server (e.g., the transaction processor 224B (e.g., a blockchain processor) of the distributed ledger server 214B) communicates the details of the spectrum allocation to a grant compliance controller 235. The grant compliance controller 235 can be running on the site server. In some embodiments, the grant compliance controller 235 may be located separately from the distributed ledger server 214B. The grant compliance controller 235 can be located at the site at which the spectrum resources are to be used. The grant compliance controller 235 translates, at operation 656, the rights delegation (i.e., the spectrum allocation) into parameters for configuring the monitoring NDs 232A-F according to the radio protocol (e.g., LTE, etc.) for which the grant was negotiated. For example, the distributed ledger server 214B may receive a confirmation of successful spectrum allocation, at operation 652. The grant compliance controller 235 receives a request 654 from the distributed ledger server 214B. The request 654 is a request to translate spectrum allocation parameters of the spectrum usage right granted to the spectrum renter from the spectrum owner into the configuration parameters for the monitoring NDs. The grant compliance controller 235 translates the spectrum allocation parameters into the configuration parameters of one or more monitoring NDs at operation 656. In this embodiment, the monitoring NDs 232A are managed by the spectrum renter and enable the monitoring of the spectrum activity at the access points 234A-F.

In some embodiments, the grant compliance controller 235 signs the message including the configuration parameters with its private key, at operation 658. The grant compliance controller 235 determines for each monitoring ND, at operation 660, a public key associated with the monitoring ND. At operation 662, for each monitoring ND, the grant compliance controller 235 encrypts the message including the configuration parameters with the public key associated with the monitoring ND. At operation 664, the grant compliance controller 235 transmits the message including the configuration parameters to the respective monitoring network device. The grant compliance controller 235 may transmit one or more additional messages to one or more monitoring NDs. Each message includes configuration parameters for configuring the respective monitoring ND receiving the configuration parameters and enables the monitoring ND to monitor wireless activity at one or more access points according to the spectrum resources allocated to the spectrum renter. In some embodiments, the configuration parameters are adapted based on the monitoring ND being configured. Each monitoring ND can receive a different set of configuration parameters. Each of the configuration parameters enable the respective monitoring ND to measure and record wireless activity of the access points and to comply with the characteristics of the spectrum resources allocated to the spectrum renter.

Upon receipt of the message including the configuration parameters, each one of the monitoring NDs 232A-F performs the operations 666-668. At operation 666, each one of the monitoring ND 232A-F authenticates the message received from the grant compliance controller 235. The authentication is performed by determining that the signature of the message is a valid signature of the grant compliance controller 235. In some embodiments, within an SGX enclave, each one of the monitoring NDs checks the signature of the grant compliance controller. Each one of the monitoring NDs 232A-F decrypts the received message using its private key. For example, the monitoring ND 232A may unwrap a TPM wrapped private key of the access point to decrypt the message. At operation 668, the monitoring ND configures receivers according to the configuration parameters in the message. At operation 670, the access point (e.g., base station) informs the grant compliance controller 235 that the radio is programmed. For example, the monitoring ND 232A may transmit an acknowledgment of successful configuration to the grant compliance controller 235. When all monitoring NDs 232A-F have reported back, the grant compliance controller 235 transmits a report of successful configuration to the distributed ledger server 214B, at operation 672. In some embodiments, the report back is performed upon determining that the grant start date has been reached (i.e., the start date and time at which the spectrum renter can start using the allocated spectrum resources). Upon receipt of the report, the distributed ledger server 214B records, at operation 674, the start of the usage of the allocated spectrum resources into the distributed ledger 204. The distributed ledger server 214B writes a transaction into the distributed ledger 204.

While both parties spectrum allocation (i.e., the spectrum owner and the spectrum renter) have incentives to ensure that the terms of the grant, i.e., the spectrum allocation parameters and the terms, are faithfully carried out, having in place a mechanism to monitor compliance helps to deter any potential cheating.

Figure 7:
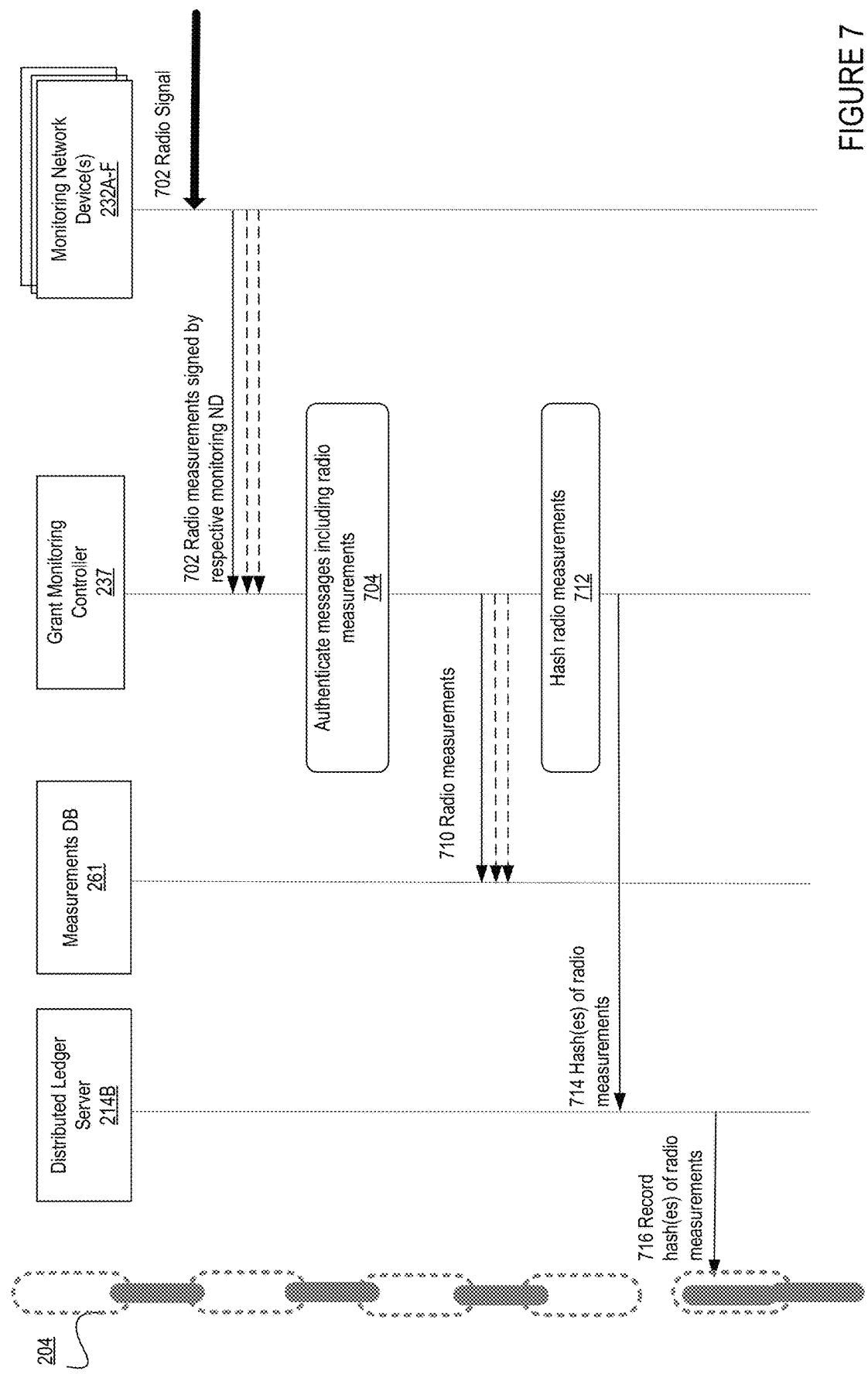
FIG. 7 illustrates a block diagram of exemplary operations for monitoring wireless activity at the access points of the spectrum renter, in accordance with some embodiments.

FIG. 7 illustrates a block diagram of exemplary operations for monitoring wireless activity at the access points of the spectrum renter, in accordance with some embodiments.

At operation 702, each one of the monitoring network devices performs measurements of the radio signals received/transmitted by one or more of the access points 234A-F. The measurements can be performed through a variety of methods such as measurement of interference rise over thermal noise over a designated measurement bandwidth, or through measurement of radiated signal level at a remote monitoring network device. In the case of commercial systems such as those based on LTE, technology specific means of monitoring such as Reference Signal Received Power (RSRP) or Reference Signal Received Quality (RSRQ) measurements from user equipment in the field can be used for performing the measurements. Requirements that the spectrum renter needs to comply with for the spectrum allocation may be based on an expectation of some percentage of measurements being within contracted bounds, such as interference rise over thermal being less than 1 dB beyond some distance from a radiator.

Each one of the monitoring network devices 232A-F formulates a message to be transmitted to the grant monitoring controller 237. The message includes the radio measurements and may be signed by the respective monitoring network device. In some embodiments, a monitoring network device 232A may within an SGX enclave, unwrap the monitoring ND's private key and sign the message with this private key. The message is then sent to the grant compliance controller 237. In some embodiments, the encryption of the message including the radio measurements is not needed as the measurements will become part of the public record once they are recorded in the distributed ledger network 204. The radio measurements are made by each monitoring network device on a periodic basis. The grant compliance controller 237 authenticates, at operation 704, the message(s) received from the monitoring network device(s) 232A-F based on the respective signatures of the monitoring network devices. For example, the grant monitoring controller 237 may determine respective public keys of the monitoring network devices and may verify the signature of the messages received from a monitoring network devices based on its associated public key. At operation 710, the grant monitoring controller 237 transmits the measurements to be stored in a measurements database 261.

At operation 712 the grant monitoring controller 237 hashes the radio measurements and transmits, at operation 714, the hashes to the distributed ledger server 214B. At operation 716, the distributed ledger server 214B records the hashes of the radio measurements in the distributed ledger network 204. Upon storage of the measurements in the measurements database, the compliance of the spectrum renter to the terms and conditions of the spectrum allocation can be verified by the spectrum owner or the regulatory authority by looking up the measurements for given periods of time. The integrity of the measurements can be confirmed by verification of the hashes of the measurements retrieved from the measurements database against the hashes recorded in the distributed network for these measurements.

Figure 8:
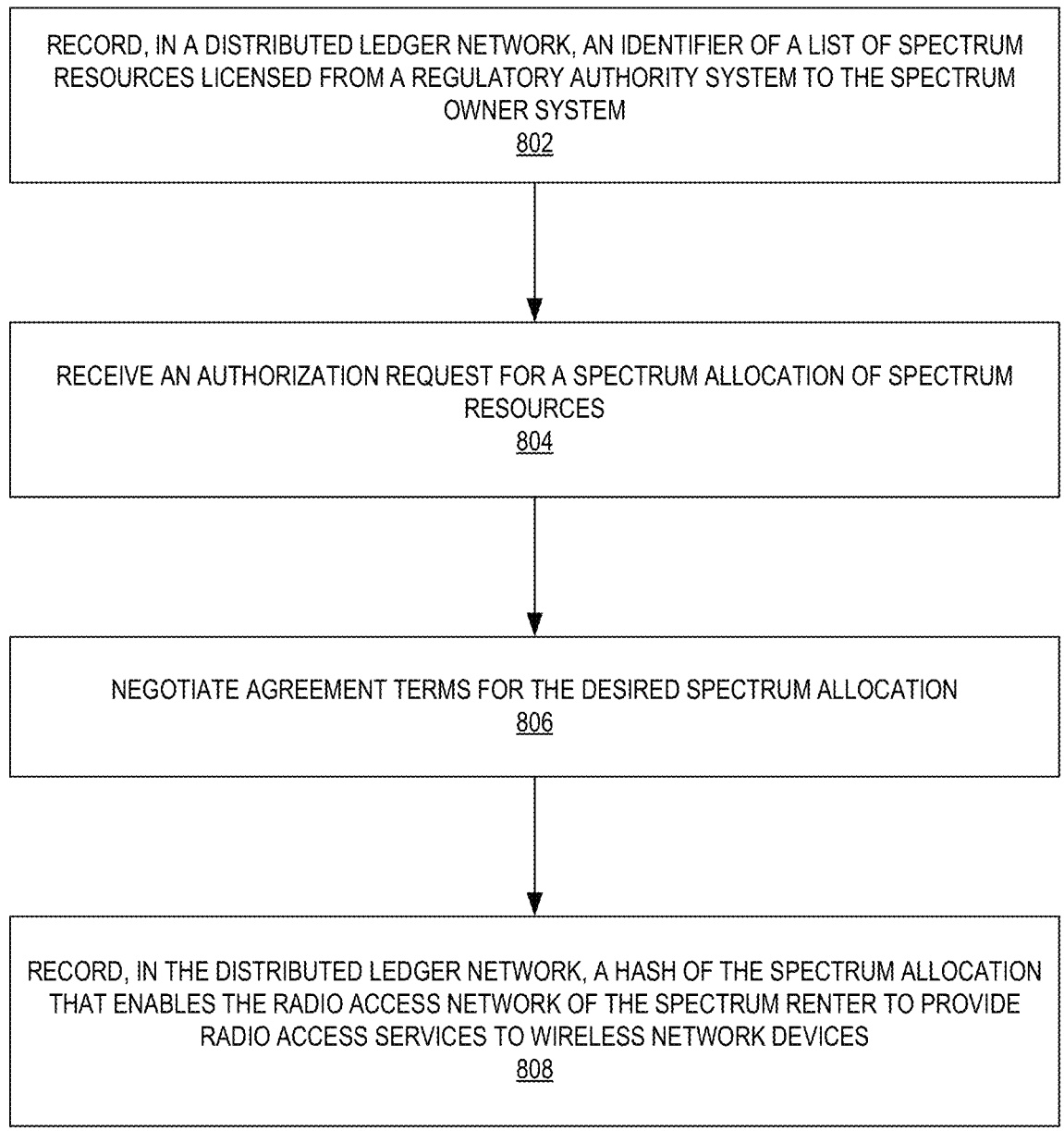
FIG. 8 illustrates a flow diagram of exemplary operations performed by a network device of a spectrum owner system in accordance with some embodiments.

FIG. 8 illustrates a flow diagram of exemplary operations performed by a network device of a spectrum owner system in accordance with some embodiments. The operations can be performed to grant a spectrum allocation to a spectrum renter (e.g., spectrum renter system 206A) for using spectrum resources at a desired location and for a desired interval of time. In some embodiments, the operations of FIG. 8 can be performed by the spectrum owner system 203A including the distributed ledger server 214A. At operation 802, the spectrum owner system (e.g., the distributed ledger server 214A of the spectrum owner system 203A) records, in a distributed ledger network 204, an identifier of a list of spectrum resources licensed from a regulatory authority system 205 to the spectrum owner system. The list of spectrum resources are available to rent to one or more potential customers for various interval of times and geographical locations. In some embodiments, the identifier of the list of spectrum resources can be a hash of a file or a web page storing the list of spectrum resources.

At operation 804, the spectrum owner system receives, from a spectrum renter system (e.g., system 206A), an authorization request for a spectrum allocation of spectrum resources. The spectrum allocation includes at least a desired interval of time for usage of the spectrum resources by a radio access network of a spectrum renter, a desired location for usage of the spectrum resources by the radio access network, and one or more additional characteristics of the spectrum resources.

Upon receipt of the request of spectrum allocation, the spectrum owner system negotiates, at operation 806, terms for the desired spectrum allocation. In some embodiments, the negotiation of the terms can be performed as described with reference to FIG. 9. The flow then moves to operation 808, at which the spectrum owner system records, in the distributed ledger network, a hash of the spectrum allocation. The spectrum allocation enables the radio access network of the spectrum renter to provide radio access services to one or more wireless network devices according to the characteristics of the spectrum resources for the desired interval of time and the desired location.

FIG. 9 illustrates a flow diagram of exemplary operations for negotiating agreement terms for the spectrum allocation, in accordance with some embodiments. At operation 902, the spectrum owner system establishes with the spectrum renter system, a private transaction channel in the distributed ledger network. At operation 904, the spectrum owner system transmits, through the private transaction channel, proposed terms for the spectrum allocation. At operation 906, the spectrum owner system receives, from the spectrum renter system, accepted terms for the spectrum allocation. At operation 908, the spectrum owner system securely stores the spectrum allocation and the accepted terms for the spectrum allocation. The spectrum allocation includes a set of spectrum allocation parameters including the desired interval of time, the desired location, and the characteristics of the spectrum resources to be used for the desired interval of time and the desired location. In some embodiments, to securely store the spectrum allocation and the accepted terms includes to encrypt, based on a cryptographic key that is shared by the spectrum renter system and the spectrum owner system, the spectrum allocation and the accepted terms.

In some embodiments, to securely store the spectrum allocation and the accepted terms further includes to store, the spectrum allocation and the accepted terms, in a storage that is separate from the distributed ledger network. In other embodiments, to securely store the spectrum allocation and the accepted terms further includes to record in the distributed ledger network the spectrum allocation and the terms of the agreement.

The embodiments presented herein propose a solution for a spectrum marketplace that improves spectrum utility and allows valuation of spectrum allocation for wireless broadband use that is commensurate with the availability of spectrum frequencies and the demand for these frequencies. The embodiments described herein involve the use of a permissioned distributed ledger network (e.g., a blockchain) on which owners of licensed spectrum (e.g., mobile network operators) can contractually assign rights to use spectrum resources to customers for a fixed period within a restricted geographical area (e.g., an industrial facility such as a manufacture or a data center, etc.). The contract between the spectrum owner and the spectrum renter allow customers to obtain a flexible access to spectrum resources for a determined location and for a determined period. The allocation of the spectrum resources from the spectrum owner to the spectrum renter is performed based on the availability of the resources at the requested location and for the requested period. The system presented herein may allow IoT applications to obtain a license for spectrum allocation over a limited period and within a delimited geographical area. Further, the system can also be used to ensure that a specific spectrum block that is being utilized over a short durations in association with a license is recorded in the distributed ledger. The system can further enable reuse of the spectrum resources when a spectrum renter ends their lease.

The embodiments presented herein propose a solution for automated spectrum policy management based on a decentralized authorization mechanism. The present embodiments describe mechanisms for creating a permissioned distributed ledger network between owners of spectrum resources and lessees/renters of the spectrum resources. The distributed ledger network is used to allow authorization of spectrum usage based on the spectrum allocation that is granted to the lessee. The proposed solution enables the definition of the contract between the spectrum owner and the spectrum renter based on a number of criteria associated with the use of the granted spectrum resources. The usage criteria of the spectrum resources (which may be referred to as spectrum allocation parameters) may include time duration of the contract, spatial confines for usage of the spectrum resources (which may include, in some embodiments, either a perimeter or a set of boundary elements that define a geographical area for protected use of the spectrum resources), the conditions of exclusivity associated with the spectrum usage (such as a guaranteed interference margin in up to e.g. 90-95% of the coverage area, etc.). The proposed solution associates the allocated spectrum resources with an owner of the spectrum, which may be an operator, or a licensee for fixed or mobile satellite service, or the regulatory authority, and automatically enables the spectrum owner to receive payment for the offered spectrum resources through an automated clearing mechanism.

Architecture:

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video, etc.). In the embodiments described above the components of the system 200 can be implemented on one or more network devices coupled in a network.

Figure 10:
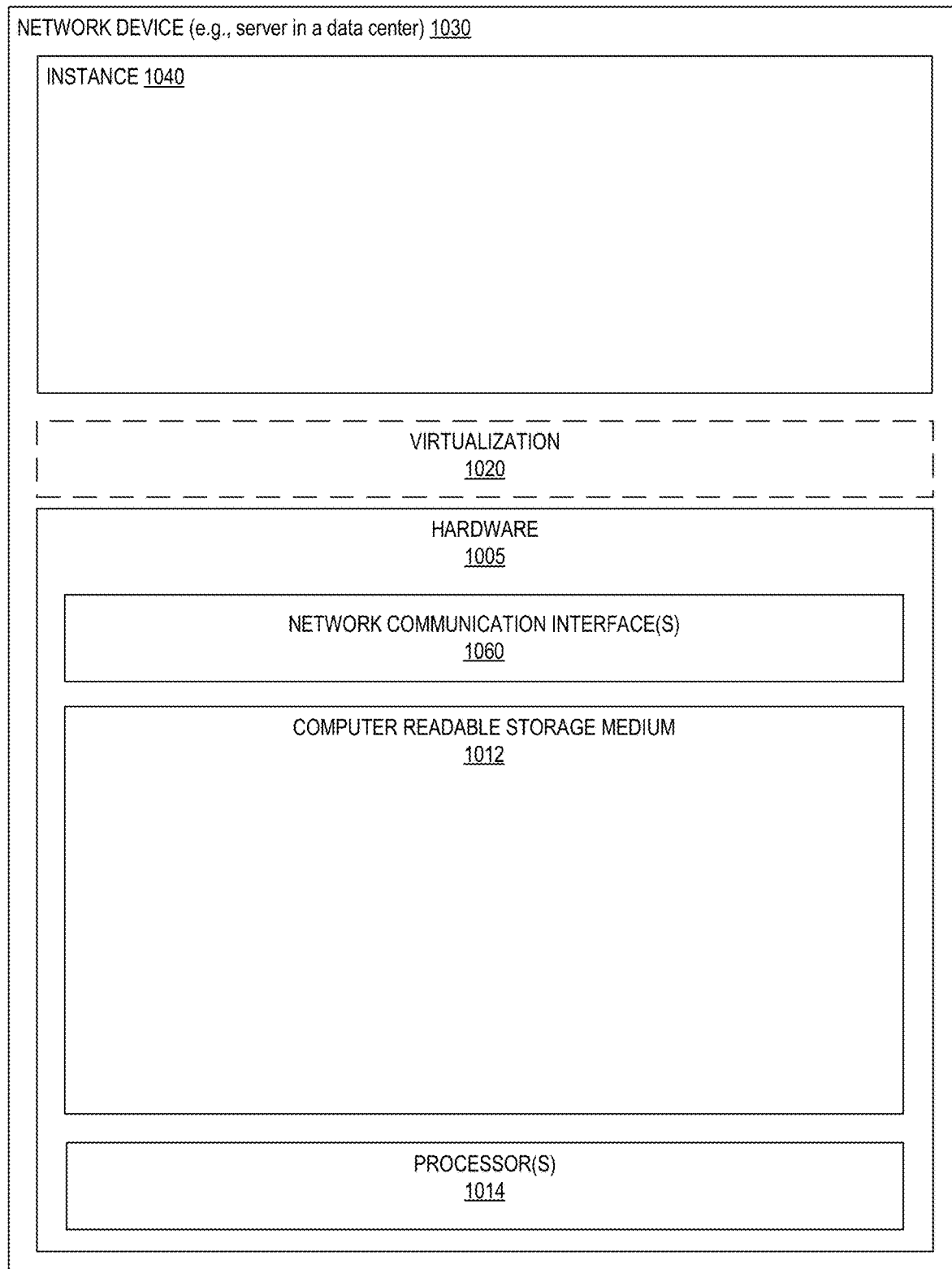
FIG. 10 illustrates a block diagram for a network device that can be used for implementing one or more of the servers described herein, in accordance with some embodiments.

FIG. 10 illustrates a block diagram for a network device that can be used for implementing one or more of the servers described herein, in accordance with some embodiments. According to one embodiment, the network device includes hardware 1005. Hardware 1005 includes network communication interfaces 1060 coupled with a computer readable storage medium 1012, and one or more processor(s) 1014 coupled with the computer readable storage medium 1012 and the network communication interfaces 1060. The computer readable storage medium 1012 may include a copy of a distributed ledger database (e.g., blockchain database) including one or more spectrum allocations and spectrum licenses recorded for spectrum owner and spectrum renters.

While one embodiment does not implement virtualization, alternative embodiments may use different forms of virtualization. For example, in one such alternative embodiment the virtualization layer 1020 represents the kernel of an operating system (or a shim executing on a base operating system) that allows for the creation of multiple instances called software containers that may each be used to execute one (or more) of the sets of applications; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 1020 represents a hypervisor (sometimes referred to as a virtual machine monitor (VMM)) or a hypervisor executing on top of a host operating system, and each of the sets of applications is run on top of a guest operating system within an instance 1040 called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 1005, directly on a hypervisor (in which case the unikernel is sometimes described as running within a LibOS virtual machine), or in a software container, embodiments can be implemented fully with unikernels running directly on a hypervisor represented by virtualization layer 1020, unikernels running within software containers represented by instances, or as a combination of unikernels and the above-described techniques (e.g., unikernels and virtual machines both run directly on a hypervisor, unikernels and sets of applications that are run in different software containers).

The instantiation of the one or more sets of one or more applications, as well as virtualization if implemented, are collectively referred to as software instance(s). Each set of applications, corresponding virtualization construct if implemented, and that part of the hardware that executes them (be it hardware dedicated to that execution and/or time slices of hardware temporally shared), forms a separate virtual network element(s).

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A network device comprising:
   a non-transitory computer readable storage medium to store instructions; and
   a processor coupled with the non-transitory computer readable storage medium to process the stored instructions to perform:
   sending, an authorization request for a spectrum allocation of spectrum resources, wherein the spectrum allocation includes at least a desired interval of time for usage of the spectrum resources by a radio access network of a spectrum renter, a desired location for usage of the spectrum resources by the radio access network, and one or more additional characteristics of the spectrum resources, and
   negotiating agreement terms for the spectrum allocation through a private transaction channel in a distributed ledger network between a spectrum owner system and a spectrum renter system that sent the authorization request, wherein a hash of the spectrum allocation is recorded in a distributed ledger network that includes a list of spectrum resources licensed from a regulatory authority system to the spectrum owner system, the list of spectrum resources available to rent to one or more potential customers, wherein the spectrum allocation enables the radio access network of the spectrum renter to provide radio access services to one or more wireless network devices according to the characteristics of the spectrum resources for the desired interval of time and the desired location.

2. The network device of claim 1, wherein negotiating the agreement terms for the spectrum allocation includes to perform:
   establishing, with the spectrum owner system, the private transaction channel in the distributed ledger network;
   receiving, through the private transaction channel, proposed agreement terms for the spectrum allocation; and
   transmitting, to the spectrum owner system, accepted agreement terms for the spectrum allocation, wherein the spectrum allocation and the accepted agreement terms for the spectrum allocation are securely stored, and wherein the spectrum allocation includes a set of spectrum allocation parameters including the desired interval of time, the desired location, and the characteristics of the spectrum resources to be used for the desired interval of time and the desired location.

3. The network device of claim 2, wherein securely storing the spectrum allocation and the accepted agreement terms includes to encrypt, based on a cryptographic key that is shared by the spectrum renter system and the spectrum owner system, the spectrum allocation and the accepted agreement terms.

4. The network device of claim 2, wherein securely storing the spectrum allocation and the accepted agreement terms further includes to store, the spectrum allocation and the accepted agreement terms, in a storage that is separate from the distributed ledger network.

5. The network device of claim 2, wherein securely storing the spectrum allocation and the accepted agreement terms further includes to record in the distributed ledger network the spectrum allocation and the agreement terms.

6. The network device of claim 1, wherein the spectrum allocation includes a set of spectrum allocation parameters including a width of a frequency of the allocated spectrum resources, starting and ending frequencies, the desired location, a geographical area that is to be covered by the spectrum allocation, the desired time interval, and a mission profile that indicates coverage objectives of deployment of the radio access network.

7. The network device of claim 6, wherein the spectrum allocation parameters further include protection boundary elements that define geographical areas in which the spectrum usage of the radio access network is to decrease below a predetermined threshold to comply with the spectrum allocation.

8. A method comprising:
   sending, an authorization request for a spectrum allocation of spectrum resources, wherein the spectrum allocation includes at least a desired interval of time for usage of the spectrum resources by a radio access network of a spectrum renter, a desired location for usage of the spectrum resources by the radio access network, and one or more additional characteristics of the spectrum resources; and
   negotiating agreement terms for the spectrum allocation through a private transaction channel in a distributed ledger network between a spectrum owner system and a spectrum renter system that sent the authorization request, wherein a hash of the spectrum allocation is recorded in a distributed ledger network that includes a list of spectrum resources licensed from a regulatory authority system to the spectrum owner system, the list of spectrum resources available to rent to one or more potential customers, wherein the spectrum allocation enables the radio access network of the spectrum renter to provide radio access services to one or more wireless network devices according to the characteristics of the spectrum resources for the desired interval of time and the desired location.

9. The method of claim 8, wherein negotiating the agreement terms for the spectrum allocation includes to perform:
   establishing, with the spectrum owner system, the private transaction channel in the distributed ledger network;
   receiving, through the private transaction channel, proposed agreement terms for the spectrum allocation; and
   transmitting, to the spectrum owner system, accepted agreement terms for the spectrum allocation, wherein the spectrum allocation and the accepted agreement terms for the spectrum allocation are securely stored, and wherein the spectrum allocation includes a set of spectrum allocation parameters including the desired interval of time, the desired location, and the characteristics of the spectrum resources to be used for the desired interval of time and the desired location.

10. The method of claim 9, wherein securely storing the spectrum allocation and the accepted agreement terms includes to encrypt, based on a cryptographic key that is shared by the spectrum renter system and the spectrum owner system, the spectrum allocation and the accepted agreement terms.

11. The method of claim 9, wherein securely storing the spectrum allocation and the accepted agreement terms further includes to store, the spectrum allocation and the accepted agreement terms, in a storage that is separate from the distributed ledger network.

12. The method of claim 9, wherein securely storing the spectrum allocation and the accepted agreement terms further includes to record in the distributed ledger network the spectrum allocation and the agreement terms.

13. The method of claim 8, wherein the spectrum allocation includes a set of spectrum allocation parameters including a width of a frequency of the allocated spectrum resources, starting and ending frequencies, the desired location, a geographical area that is to be covered by the spectrum allocation, the desired time interval, and a mission profile that indicates coverage objectives of deployment of the radio access network.

14. The method of claim 13, wherein the spectrum allocation parameters further include protection boundary elements that define geographical areas in which the spectrum usage of the radio access network is to decrease below a predetermined threshold to comply with the spectrum allocation.

15. A non-transitory machine-readable medium comprising computer program code which when executed by a processor carries out operations comprising:
   sending, an authorization request for a spectrum allocation of spectrum resources, wherein the spectrum allocation includes at least a desired interval of time for usage of the spectrum resources by a radio access network of a spectrum renter, a desired location for usage of the spectrum resources by the radio access network, and one or more additional characteristics of the spectrum resources; and
   negotiating agreement terms for the spectrum allocation through a private transaction channel in a distributed ledger network between a spectrum owner system and a spectrum renter system that sent the authorization request, wherein a hash of the spectrum allocation is recorded in a distributed ledger network that includes a list of spectrum resources licensed from a regulatory authority system to the spectrum owner system, the list of spectrum resources available to rent to one or more potential customers, wherein the spectrum allocation enables the radio access network of the spectrum renter to provide radio access services to one or more wireless network devices according to the characteristics of the spectrum resources for the desired interval of time and the desired location.

16. The non-transitory machine-readable medium of claim 15, wherein negotiating the agreement terms for the spectrum allocation includes to perform:
   establishing, with the spectrum owner system, the private transaction channel in the distributed ledger network;
   receiving, through the private transaction channel, proposed agreement terms for the spectrum allocation;
   transmitting, to the spectrum owner system, accepted agreement terms for the spectrum allocation, wherein the spectrum allocation and the accepted agreement terms for the spectrum allocation are securely stored, and wherein the spectrum allocation includes a set of spectrum allocation parameters including the desired interval of time, the desired location, and the characteristics of the spectrum resources to be used for the desired interval of time and the desired location.

17. The non-transitory machine-readable medium of claim 16, wherein securely storing the spectrum allocation and the accepted agreement terms includes to encrypt, based on a cryptographic key that is shared by the spectrum renter system and the spectrum owner system, the spectrum allocation and the accepted agreement terms.

18. The non-transitory machine-readable medium of claim 16, wherein securely storing the spectrum allocation and the accepted agreement terms further includes to store, the spectrum allocation and the accepted agreement terms, in a storage that is separate from the distributed ledger network.

19. The non-transitory machine-readable medium of claim 16, wherein securely storing the spectrum allocation and the accepted agreement terms further includes to record in the distributed ledger network the spectrum allocation and the agreement terms.

20. The non-transitory machine-readable medium of claim 15, wherein the spectrum allocation includes a set of spectrum allocation parameters including a width of a frequency of the allocated spectrum resources, starting and ending frequencies, the desired location, a geographical area that is to be covered by the spectrum allocation, the desired time interval, and a mission profile that indicates coverage objectives of deployment of the radio access network.

* * * * *